United States Patent [19]
Kobayashi et al.

[11] Patent Number: 5,828,639
[45] Date of Patent: Oct. 27, 1998

[54] RECORDING/PLAYBACK DEVICE AND METHOD THEREOF, AND DISC

[75] Inventors: Shoei Kobayashi, Kanagawa; Toru Takeda, Saitama; Tamotsu Yamagami, Kanagawa, all of Japan

[73] Assignee: Sony Corporation, Tokyo, Japan

[21] Appl. No.: 799,982

[22] Filed: Feb. 12, 1997

[30] Foreign Application Priority Data

Feb. 15, 1996 [JP] Japan ...................................... 8-052502

[51] Int. Cl.⁶ ........................................................ G11B 7/02
[52] U.S. Cl. ................................ 369/58; 369/47; 369/50; 369/275.3
[58] Field of Search .................................. 369/48, 42, 49, 369/50, 54, 58, 59, 60, 225.2, 225.3

[56] References Cited

U.S. PATENT DOCUMENTS

| | | | |
|---|---|---|---|
| 5,111,305 | 5/1992 | Yamashita | 369/50 X |
| 5,245,595 | 9/1993 | Yasukawa | 369/50 X |
| 5,563,800 | 10/1996 | Kubo et al. | 369/50 |

*Primary Examiner*—Muhammad N. Edun
*Attorney, Agent, or Firm*—Limbach & Limbach LLP

[57] ABSTRACT

A data recording region of a disc is divided into a plurality of zones, the plurality of zones comprising a plurality of bands, and with a range from an innermost radius to an outermost radius being divided into four bands by four radii, with the rotational velocity of the disc at each of the bands being fixed in such a manner as to increase disc capacity.

8 Claims, 31 Drawing Sheets

Wobbled Data Frame Structure

FIG. 19

| zone NO. | r (μm) | frame/trk | trk/zone | EBLK/zone | bit min(μm/b) | cap(byte) | rotation 1(rpm) | vel. min. 1(m/s) | vel. max. 1(m/s) |
|---|---|---|---|---|---|---|---|---|---|
| 0  | 24000.0 | 520 | 420 | 520 | 0.390 | 17039360 | 2048 | 5.15 | 5.23 |
| 1  | 24365.4 | 528 | 420 | 528 | 0.390 | 17301504 | 2048 | 5.23 | 5.30 |
| 2  | 24730.8 | 536 | 420 | 536 | 0.390 | 17563648 | 2048 | 5.30 | 5.38 |
| 3  | 25096.2 | 544 | 420 | 544 | 0.390 | 17825792 | 2048 | 5.38 | 5.46 |
| 4  | 25461.6 | 552 | 420 | 552 | 0.390 | 18087936 | 2048 | 5.46 | 5.54 |
| 5  | 25827.0 | 560 | 420 | 560 | 0.390 | 18350080 | 2048 | 5.54 | 5.62 |
| 6  | 26192.4 | 568 | 420 | 568 | 0.389 | 18612224 | 2048 | 5.62 | 5.70 |
| 7  | 26557.8 | 576 | 420 | 576 | 0.389 | 18874368 | 2048 | 5.70 | 5.78 |
| 8  | 26923.2 | 584 | 420 | 584 | 0.389 | 19136512 | 2048 | 5.78 | 5.85 |
| 9  | 27288.6 | 592 | 420 | 592 | 0.389 | 19398656 | 2048 | 5.85 | 5.93 |
| 10 | 27654.0 | 600 | 420 | 600 | 0.389 | 19660800 | 2048 | 5.93 | 6.01 |
| 11 | 28019.4 | 608 | 420 | 608 | 0.389 | 19922944 | 2048 | 6.01 | 6.09 |
| 12 | 28384.8 | 616 | 420 | 616 | 0.389 | 20185088 | 2048 | 6.09 | 6.17 |
| 13 | 28750.2 | 624 | 420 | 624 | 0.389 | 20447232 | 2048 | 6.17 | 6.25 |
| 14 | 29115.6 | 632 | 420 | 632 | 0.389 | 20709376 | 2048 | 6.25 | 6.32 |
| 15 | 29481.0 | 640 | 420 | 640 | 0.389 | 20971520 | 2048 | 6.32 | 6.40 |
| 16 | 29846.4 | 648 | 420 | 648 | 0.389 | 21233664 | 2048 | 6.40 | 6.48 |
| 17 | 30211.8 | 656 | 420 | 656 | 0.389 | 21495808 | 2048 | 6.48 | 6.56 |
| 18 | 30577.2 | 664 | 420 | 664 | 0.389 | 21757952 | 2048 | 6.56 | 6.64 |
| 19 | 30942.6 | 672 | 420 | 672 | 0.389 | 22020096 | 2048 | 6.64 | 6.72 |
| 20 | 31308.0 | 680 | 420 | 680 | 0.389 | 22282240 | 2048 | 6.72 | 6.79 |
| 21 | 31673.4 | 688 | 420 | 688 | 0.389 | 22544384 | 2048 | 6.79 | 6.87 |
| 22 | 32038.8 | 696 | 420 | 696 | 0.389 | 22806528 | 2048 | 9.87 | 6.95 |
| 23 | 32404.2 | 704 | 420 | 704 | 0.389 | 23068672 | 2048 | 6.95 | 7.03 |
| 24 | 32769.6 | 712 | 420 | 712 | 0.389 | 23330816 | 2048 | 7.03 | 7.11 |
| 25 | 33135.0 | 720 | 420 | 720 | 0.389 | 23592960 | 2048 | 7.11 | 7.19 |

FIG. 20

| zone NO. | r (μm) | frame / trk | trk / zone | EBLK / zone | bit min(μm/b) | cap(byte) | rotation 1(rpm) | vel. min. 1(m/s) | vel. max. 1(m/s) |
|---|---|---|---|---|---|---|---|---|---|
| 26 | 33500.4 | 728 | 420 | 728 | 0.389 | 23855104 | 2048 | 7.19 | 7.26 |
| 27 | 33865.8 | 736 | 420 | 736 | 0.389 | 24117248 | 2048 | 7.26 | 7.34 |
| 28 | 34231.2 | 744 | 420 | 744 | 0.389 | 24379392 | 2048 | 7.34 | 7.42 |
| 29 | 34596.6 | 752 | 420 | 752 | 0.389 | 24641536 | 2048 | 7.42 | 7.50 |
| 30 | 34962.0 | 760 | 420 | 460 | 0.388 | 24903680 | 2048 | 7.50 | 7.58 |
| 31 | 35327.4 | 768 | 420 | 768 | 0.388 | 25165824 | 2048 | 7.58 | 7.66 |
| 32 | 35692.8 | 776 | 420 | 776 | 0.388 | 25427968 | 2048 | 7.66 | 7.73 |
| 33 | 36058.2 | 784 | 420 | 784 | 0.388 | 25690112 | 2048 | 7.73 | 7.81 |
| 34 | 36423.6 | 792 | 420 | 792 | 0.388 | 28952256 | 2048 | 7.18 | 7.89 |
| 35 | 36789.0 | 800 | 420 | 800 | 0.388 | 26214400 | 2048 | 7.89 | 7.97 |
| 36 | 37154.4 | 808 | 420 | 808 | 0.388 | 26476544 | 2048 | 7.97 | 8.05 |
| 37 | 37519.8 | 816 | 420 | 816 | 0.388 | 26738688 | 2048 | 8.05 | 8.13 |
| 38 | 37885.2 | 824 | 420 | 824 | 0.388 | 27000832 | 2048 | 8.13 | 8.20 |
| 39 | 38250.6 | 832 | 420 | 832 | 0.388 | 27262976 | 2048 | 8.20 | 8.28 |
| 40 | 38616.0 | 840 | 420 | 840 | 0.388 | 27525120 | 2048 | 8.28 | 8.36 |
| 41 | 38981.4 | 848 | 420 | 848 | 0.388 | 27787264 | 2048 | 8.36 | 8.44 |
| 42 | 39346.8 | 856 | 420 | 856 | 0.388 | 28049408 | 2048 | 8.44 | 8.52 |
| 43 | 39712.2 | 564 | 420 | 864 | 0.388 | 28311552 | 2048 | 8.52 | 8.60 |
| 44 | 40077.6 | 872 | 420 | 872 | 0.388 | 28573696 | 2048 | 8.60 | 8.67 |
| 45 | 40443.0 | 880 | 420 | 880 | 0.388 | 28835840 | 2048 | 8.67 | 8.75 |
| 46 | 40808.4 | 888 | 420 | 888 | 0.388 | 29097984 | 2048 | 8.75 | 8.83 |
| 47 | 41173.8 | 896 | 420 | 896 | 0.388 | 29360128 | 2048 | 8.83 | 8.91 |
| 48 | 41539.2 | 904 | 420 | 904 | 0.388 | 29622212 | 2048 | 8.91 | 8.99 |
| 49 | 41904.6 | 912 | 420 | 912 | 0.388 | 29884416 | 2048 | 8.99 | 9.07 |
| 50 | 42270.0 | 920 | 420 | 920 | 0.388 | 30146560 | 2048 | 9.07 | 9.15 |
| 51 | 42635.4 | 928 | 420 | 928 | 0.388 | 30408704 | 2048 | 9.15 | 9.22 |

FIG. 21

| zone NO. | r (μm) | frame / trk | trk / zone | EBLK / zone | bit min(μm/b) | cap(byte) | rotation 1(rpm) | vel. min. 1(m/s) | vel. max. 1(m/s) |
| --- | --- | --- | --- | --- | --- | --- | --- | --- | --- |
| 52 | 43000.8 | 936 | 420 | 936 | 0.388 | 30670848 | 2048 | 9.22 | 9.30 |
| 53 | 43366.2 | 944 | 420 | 944 | 0.388 | 30932992 | 2048 | 9.30 | 9.38 |
| 54 | 43731.6 | 952 | 420 | 952 | 0.388 | 31195136 | 2048 | 9.38 | 9.46 |
| 55 | 44097.0 | 960 | 420 | 960 | 0.388 | 31457280 | 2048 | 9.46 | 9.54 |
| 56 | 44462.4 | 968 | 420 | 968 | 0.388 | 31719424 | 2048 | 9.54 | 9.62 |
| 57 | 44827.8 | 976 | 420 | 976 | 0.388 | 31981568 | 2048 | 9.62 | 9.69 |
| 58 | 45193.2 | 984 | 420 | 984 | 0.388 | 32243712 | 2048 | 9.69 | 9.77 |
| 59 | 45558.6 | 995 | 420 | 995 | 0.388 | 32505856 | 2048 | 9.77 | 9.85 |
| 60 | 45924.0 | 1000 | 420 | 1000 | 0.388 | 32768000 | 2048 | 9.85 | 9.93 |
| 61 | 46289.4 | 1008 | 420 | 1008 | 0.388 | 33030144 | 2048 | 9.93 | 10.01 |
| 62 | 46654.8 | 1016 | 420 | 1016 | 0.388 | 33292288 | 2048 | 10.01 | 10.09 |
| 63 | 47020.2 | 1024 | 420 | 1024 | 0.388 | 33554432 | 2048 | 10.09 | 10.16 |
| 64 | 47385.6 | 1032 | 420 | 1032 | 0.388 | 33836576 | 2048 | 10.16 | 10.24 |
| 65 | 47751.0 | 1040 | 420 | 1040 | 0.388 | 34078720 | 2048 | 10.24 | 10.32 |
| 66 | 48116.4 | 1048 | 420 | 1048 | 0.388 | 34340864 | 2048 | 10.32 | 10.40 |
| 67 | 48481.8 | 1056 | 420 | 1056 | 0.388 | 34606008 | 2048 | 10.40 | 10.48 |
| 68 | 48847.2 | 1064 | 420 | 1064 | 0.388 | 34865152 | 2048 | 10.48 | 10.56 |
| 69 | 49212.6 | 1072 | 420 | 1072 | 0.388 | 35127296 | 2048 | 10.56 | 10.63 |
| 70 | 49578.0 | 1080 | 420 | 1080 | 0.388 | 35389440 | 2048 | 10.63 | 10.71 |
| 71 | 49943.4 | 1088 | 420 | 1088 | 0.388 | 35651584 | 2048 | 10.71 | 10.79 |
| 72 | 50308.8 | 1096 | 420 | 1096 | 0.388 | 35913728 | 2048 | 10.79 | 10.87 |
| 73 | 50674.2 | 1104 | 420 | 1104 | 0.388 | 36175872 | 2048 | 10.87 | 10.95 |
| 74 | 51039.6 | 1112 | 420 | 1112 | 0.388 | 36438016 | 2048 | 10.95 | 11.03 |
| 75 | 51405.0 | 1120 | 420 | 1120 | 0.388 | 36700160 | 2048 | 11.03 | 11.10 |
| 76 | 51770.4 | 1128 | 420 | 1128 | 0.388 | 36962304 | 2048 | 11.10 | 11.18 |
| 77 | 52135.8 | 1136 | 420 | 1136 | 0.388 | 37224448 | 2048 | 11.18 | 11.26 |

FIG. 22

| zone NO. | r (μm) | frame/trk | trk/zone | EBLK/zone | bit min(μm/b) | cap(byte) | rotation 1(rpm) | vel. min. 1(m/s) | vel. max. 1(m/s) |
|---|---|---|---|---|---|---|---|---|---|
| 78 | 52501.2 | 1144 | 420 | 1144 | 0.388 | 37486592 | 2048 | 11.26 | 11.34 |
| 79 | 52866.6 | 1152 | 420 | 1152 | 0.388 | 37748736 | 2048 | 11.34 | 11.42 |
| 80 | 53232.0 | 1160 | 420 | 1160 | 0.388 | 38010880 | 2048 | 11.42 | 11.50 |
| 81 | 53597.4 | 1168 | 420 | 1168 | 0.388 | 38273024 | 2048 | 11.50 | 11.57 |
| 82 | 53962.8 | 1176 | 420 | 1176 | 0.388 | 38535168 | 2048 | 11.57 | 11.65 |
| 83 | 54328.2 | 1184 | 420 | 1184 | 0.388 | 38797312 | 2048 | 11.65 | 11.73 |
| 84 | 54693.6 | 1192 | 420 | 1192 | 0.387 | 39059456 | 2048 | 11.73 | 11.81 |
| 85 | 55059.0 | 1200 | 420 | 1120 | 0.387 | 39321600 | 2048 | 11.81 | 11.89 |
| 86 | 55424.4 | 1208 | 420 | 1208 | 0.387 | 39583744 | 2048 | 11.89 | 11.97 |
| 87 | 55789.8 | 1216 | 420 | 1216 | 0.387 | 39845888 | 2048 | 11.97 | 12.05 |
| 88 | 56155.2 | 1224 | 420 | 1224 | 0.387 | 40108012 | 2048 | 12.05 | 12.12 |
| 89 | 56520.6 | 1232 | 420 | 1232 | 0.387 | 40370176 | 2048 | 12.12 | 12.20 |
| 90 | 56886.0 | 1240 | 420 | 1240 | 0.387 | 40632320 | 2048 | 12.20 | 12.28 |
| 91 | 57251.4 | 1248 | 420 | 1248 | 0.387 | 40894464 | 2048 | 12.28 | 12.36 |
| 92 | 57616.8 | 1256 | 420 | 1256 | 0.387 | 41156608 | 2048 | 12.36 | 12.44 |
| | 57982.2 | | 39060 | 82584 | | 2.706E+09 | | | |

FIG. 42

| zone NO. | r (μm) | frame / trk | trk / zone | EBLK / zone | bit min(μm/b) | cap(byte) | rotation 2(rpm) | vel. min. 2(m/s) | vel. max. 2(m/s) |
|---|---|---|---|---|---|---|---|---|---|
| 0 | 24000.0 | 520 | 420 | 520 | 0.390 | 17039360 | 2048 | 5.15 | 5.23 |
| 1 | 24365.4 | 528 | 420 | 528 | 0.390 | 17301504 | 2048 | 5.23 | 5.30 |
| 2 | 24730.8 | 536 | 420 | 536 | 0.390 | 17563648 | 2048 | 5.30 | 5.38 |
| 3 | 25096.2 | 544 | 420 | 544 | 0.390 | 17825792 | 2048 | 5.38 | 5.46 |
| 4 | 25461.6 | 552 | 420 | 552 | 0.390 | 18087936 | 2048 | 5.46 | 5.54 |
| 5 | 25827.0 | 560 | 420 | 560 | 0.390 | 18350080 | 2048 | 5.54 | 5.62 |
| 6 | 26192.4 | 568 | 420 | 568 | 0.389 | 18612224 | 2048 | 5.62 | 5.70 |
| 7 | 26557.8 | 576 | 420 | 576 | 0.389 | 18874368 | 2048 | 5.70 | 5.78 |
| 8 | 26923.2 | 584 | 420 | 584 | 0.389 | 19136512 | 2048 | 5.78 | 5.85 |
| 9 | 27288.6 | 592 | 420 | 592 | 0.389 | 19398656 | 2048 | 5.85 | 5.93 |
| 10 | 27654.0 | 600 | 420 | 600 | 0.389 | 19660800 | 2048 | 5.93 | 6.01 |
| 11 | 28019.4 | 608 | 420 | 608 | 0.389 | 19922944 | 2048 | 6.01 | 6.09 |
| 12 | 28384.8 | 616 | 420 | 616 | 0.389 | 20185088 | 2048 | 6.09 | 6.17 |
| 13 | 28750.2 | 624 | 420 | 624 | 0.389 | 20447232 | 2048 | 6.17 | 6.25 |
| 14 | 29115.6 | 632 | 420 | 632 | 0.389 | 20709376 | 2048 | 6.25 | 6.32 |
| 15 | 29481.0 | 640 | 420 | 640 | 0.389 | 20971520 | 2048 | 6.32 | 6.40 |
| 16 | 29846.4 | 648 | 420 | 648 | 0.389 | 21233664 | 1644 | 5.14 | 5.20 |
| 17 | 30211.8 | 656 | 420 | 656 | 0.389 | 21495808 | 1644 | 5.20 | 5.26 |
| 18 | 30577.2 | 664 | 420 | 664 | 0.389 | 21757952 | 1644 | 5.26 | 5.33 |
| 19 | 30942.6 | 672 | 420 | 672 | 0.389 | 22020096 | 1644 | 5.33 | 5.39 |
| 20 | 30308.0 | 680 | 420 | 680 | 0.389 | 22282240 | 1644 | 5.39 | 5.45 |
| 21 | 31673.4 | 688 | 420 | 688 | 0.389 | 22544384 | 1644 | 5.45 | 5.51 |
| 22 | 32038.8 | 696 | 420 | 696 | 0.389 | 22806528 | 1644 | 5.51 | 5.58 |
| 23 | 32404.2 | 704 | 420 | 704 | 0.389 | 23068672 | 1644 | 5.58 | 5.64 |
| 24 | 32769.6 | 712 | 420 | 712 | 0.389 | 23330816 | 1644 | 5.64 | 5.70 |
| 25 | 33135.0 | 720 | 420 | 720 | 0.389 | 23592960 | 1644 | 5.70 | 5.77 |

FIG. 43

| zone NO. | r (μm) | frame / trk | trk / zone | EBLK / zone | bit min(μm/b) | cap(byte) | rotation 2(rpm) | vel. min. 2(m/s) | vel. max. 2(m/s) |
|---|---|---|---|---|---|---|---|---|---|
| 26 | 33500.4 | 728 | 420 | 728 | 0.389 | 23855104 | 1644 | 5.77 | 5.83 |
| 27 | 33865.8 | 736 | 420 | 736 | 0.389 | 24117248 | 1644 | 5.83 | 5.89 |
| 28 | 34231.2 | 744 | 420 | 744 | 0.389 | 24379392 | 1644 | 5.89 | 5.96 |
| 29 | 34596.6 | 752 | 420 | 752 | 0.389 | 24641536 | 1644 | 5.96 | 6.02 |
| 30 | 34962.0 | 760 | 420 | 460 | 0.388 | 24903680 | 1644 | 6.02 | 6.08 |
| 31 | 35327.4 | 768 | 420 | 768 | 0.388 | 25165824 | 1644 | 6.08 | 6.14 |
| 32 | 35692.8 | 776 | 420 | 776 | 0.388 | 25427968 | 1644 | 6.14 | 6.21 |
| 33 | 36058.2 | 784 | 420 | 784 | 0.388 | 25690112 | 1644 | 6.21 | 6.27 |
| 34 | 36423.6 | 792 | 420 | 792 | 0.388 | 28952256 | 1644 | 6.27 | 6.33 |
| 35 | 36789.0 | 800 | 420 | 800 | 0.388 | 26214400 | 1644 | 6.33 | 6.40 |
| 36 | 37154.4 | 808 | 420 | 808 | 0.388 | 26476544 | 1318 | 5.13 | 5.18 |
| 37 | 37519.8 | 816 | 420 | 816 | 0.388 | 26738688 | 1318 | 5.18 | 5.23 |
| 38 | 37885.2 | 824 | 420 | 824 | 0.388 | 27000832 | 1318 | 5.23 | 5.28 |
| 39 | 38250.6 | 832 | 420 | 832 | 0.388 | 27262976 | 1318 | 5.28 | 5.33 |
| 40 | 38616.0 | 840 | 420 | 840 | 0.388 | 27525120 | 1318 | 5.33 | 5.38 |
| 41 | 38981.4 | 848 | 420 | 848 | 0.388 | 27787264 | 1318 | 5.38 | 5.43 |
| 42 | 39346.8 | 856 | 420 | 856 | 0.388 | 28049408 | 1318 | 5.43 | 5.48 |
| 43 | 39712.2 | 564 | 420 | 864 | 0.388 | 28311552 | 1318 | 5.48 | 5.53 |
| 44 | 40077.6 | 872 | 420 | 872 | 0.388 | 28573696 | 1318 | 5.53 | 5.58 |
| 45 | 40443.0 | 880 | 420 | 880 | 0.388 | 28835840 | 1318 | 5.58 | 5.63 |
| 46 | 40808.4 | 888 | 420 | 888 | 0.388 | 29097984 | 1318 | 5.63 | 5.68 |
| 47 | 41173.8 | 896 | 420 | 896 | 0.388 | 29360128 | 1318 | 5.68 | 5.73 |
| 48 | 41539.2 | 904 | 420 | 904 | 0.388 | 29622272 | 1318 | 5.73 | 5.78 |
| 49 | 41904.6 | 912 | 420 | 912 | 0.388 | 29884416 | 1318 | 5.78 | 5.84 |
| 50 | 42270.0 | 920 | 420 | 920 | 0.388 | 30146560 | 1318 | 5.84 | 5.89 |
| 51 | 42635.4 | 928 | 420 | 928 | 0.388 | 30408704 | 1318 | 5.89 | 5.94 |

FIG. 44

| zone NO. | r (μm) | frame/trk | trk/zone | EBLK/zone | bit min(μm/b) | cap(byte) | rotation 2(rpm) | vel. min. 2(m/s) | vel. max. 2(m/s) |
|---|---|---|---|---|---|---|---|---|---|
| 52 | 43000.8 | 936 | 420 | 936 | 0.388 | 30670848 | 1318 | 5.94 | 5.99 |
| 53 | 43366.2 | 944 | 420 | 944 | 0.388 | 30932992 | 1318 | 5.99 | 6.04 |
| 54 | 43731.6 | 952 | 420 | 952 | 0.388 | 31195136 | 1318 | 6.04 | 6.09 |
| 55 | 44097.0 | 960 | 420 | 960 | 0.388 | 31457280 | 1318 | 6.09 | 6.14 |
| 56 | 44462.4 | 968 | 420 | 968 | 0.388 | 31719424 | 1318 | 6.14 | 6.19 |
| 57 | 44827.8 | 976 | 420 | 976 | 0.388 | 31981568 | 1318 | 6.19 | 6.24 |
| 58 | 45193.2 | 984 | 420 | 984 | 0.388 | 32243712 | 1318 | 6.24 | 6.29 |
| 59 | 45558.6 | 992 | 420 | 992 | 0.388 | 32505856 | 1318 | 6.29 | 6.34 |
| 60 | 45924.0 | 1000 | 420 | 1000 | 0.388 | 32768000 | 1318 | 6.34 | 6.39 |
| 61 | 46289.4 | 1008 | 420 | 1008 | 0.388 | 33030144 | 1057 | 5.12 | 5.16 |
| 62 | 46654.8 | 1016 | 420 | 1016 | 0.388 | 33292288 | 1057 | 5.16 | 5.20 |
| 63 | 47020.2 | 1024 | 420 | 1024 | 0.388 | 33554432 | 1057 | 5.20 | 5.24 |
| 64 | 47385.6 | 1032 | 420 | 1032 | 0.388 | 33836576 | 1057 | 5.24 | 5.28 |
| 65 | 47751.0 | 1040 | 420 | 1040 | 0.388 | 34078720 | 1057 | 5.28 | 5.32 |
| 66 | 48116.4 | 1048 | 420 | 1048 | 0.388 | 34340864 | 1057 | 5.32 | 5.36 |
| 67 | 48481.8 | 1056 | 420 | 1056 | 0.388 | 34603008 | 1057 | 5.36 | 5.41 |
| 68 | 48847.2 | 1064 | 420 | 1064 | 0.388 | 34865152 | 1057 | 5.41 | 5.45 |
| 69 | 49212.6 | 1072 | 420 | 1072 | 0.388 | 35127296 | 1057 | 5.45 | 5.49 |
| 70 | 49578.0 | 1080 | 420 | 1080 | 0.388 | 35389440 | 1057 | 5.49 | 5.53 |
| 71 | 49943.4 | 1088 | 420 | 1088 | 0.388 | 35651584 | 1057 | 5.53 | 5.57 |
| 72 | 50308.8 | 1096 | 420 | 1096 | 0.388 | 35913728 | 1057 | 5.57 | 5.61 |
| 73 | 50674.2 | 1104 | 420 | 1104 | 0.388 | 36175872 | 1057 | 5.61 | 5.65 |
| 74 | 51039.6 | 1112 | 420 | 1112 | 0.388 | 36438016 | 1057 | 5.65 | 6.69 |
| 75 | 51405.0 | 1120 | 420 | 1120 | 0.388 | 36700160 | 1057 | 6.69 | 5.73 |
| 76 | 51770.4 | 1128 | 420 | 1128 | 0.388 | 36962304 | 1057 | 5.73 | 5.77 |
| 77 | 52135.8 | 1136 | 420 | 1136 | 0.388 | 37224448 | 1057 | 5.77 | 5.81 |

FIG. 45

| zone NO. | r (μm) | frame/trk | trk/zone | EBLK/zone | bit min(μm/b) | cap(byte) | rotation 2(rpm) | vel. min. 2(m/s) | vel. max. 2(m/s) |
|---|---|---|---|---|---|---|---|---|---|
| 78 | 52501.2 | 1144 | 420 | 1144 | 0.388 | 37486592 | 1057 | 5.81 | 5.85 |
| 79 | 52866.6 | 1152 | 420 | 1152 | 0.388 | 37748736 | 1057 | 5.85 | 5.89 |
| 80 | 53232.0 | 1160 | 420 | 1160 | 0.388 | 38010880 | 1057 | 5.89 | 5.93 |
| 81 | 53597.4 | 1168 | 420 | 1168 | 0.388 | 38273024 | 1057 | 5.93 | 5.97 |
| 82 | 53962.8 | 1176 | 420 | 1178 | 0.388 | 38535168 | 1057 | 5.97 | 6.01 |
| 83 | 54328.2 | 1184 | 420 | 1184 | 0.388 | 38797312 | 1057 | 6.01 | 6.05 |
| 84 | 54693.6 | 1192 | 420 | 1192 | 0.387 | 39059456 | 1057 | 6.05 | 6.09 |
| 85 | 55059.0 | 1120 | 420 | 1200 | 0.387 | 39321600 | 1057 | 6.09 | 6.13 |
| 86 | 55424.4 | 1208 | 420 | 1208 | 0.387 | 39583744 | 1057 | 6.13 | 6.17 |
| 87 | 55789.8 | 1216 | 420 | 1216 | 0.387 | 39845888 | 1057 | 6.17 | 6.21 |
| 88 | 56155.2 | 1224 | 420 | 1224 | 0.387 | 40108012 | 1057 | 6.21 | 6.25 |
| 89 | 56520.6 | 1232 | 420 | 1232 | 0.387 | 40370176 | 1057 | 6.25 | 6.29 |
| 90 | 56886.0 | 1240 | 420 | 1240 | 0.387 | 40632320 | 1057 | 6.29 | 6.34 |
| 91 | 57251.4 | 1248 | 420 | 1248 | 0.387 | 40894464 | 1057 | 6.34 | 6.38 |
| 92 | 57616.8 | 1256 | 420 | 1256 | 0.387 | 41156608 | 1057 | 6.38 | 6.42 |
| | 57982.2 | | 39060 | 82584 | | 2.706E+09 | | | |

RECORDING/PLAYBACK DEVICE AND METHOD THEREOF, AND DISC

BACKGROUND OF THE INVENTION

The present invention relates to a recording/playback device, method and disc, and more particularly relates to a recording/playback device, method and disc capable of high density data recording and/or playing back.

CAV (Constant Angular Velocity) discs where the angular velocity is constant and CLV (Constant Linear Velocity) discs where the linear velocity is constant exist. Access is simple with CAV discs because corresponding addresses are arranged at the same radius. Rapid access is, however, difficult with CLV discs because addresses are not uniform across the same radius, but recording capacity can be increased when compared with CAV discs.

The linear velocity is greater at the outer periphery than at the inner periphery with usual CAV discs. In the case of, for example, a compact disc (CD) where the diameter is 120 mm, when the radius of the recording playback region is taken to be in the range of 24 mm to 58 mm, the linear velocity at the outer periphery is 2.4 times that at the inner periphery. It has been suggested that the data transfer rate is made to be approximately 11 Mbps when video data is recorded and played-back in line with the MPEG2 format.

When the linear density is taken to be approximately 0.38 $\mu$m/bit, and the format efficiency is taken to be approximately 85% excluding redundant portions for error correction etc., the linear velocity at the inner periphery of a radius of 24 mm is approximately 5 m/sec and is approximately 12 m/sec at the outer periphery where the radius is 58 mm.

Usually, when the linear velocity is high, it is necessary to increase the intensity of the illuminating light during data recording, but this is limited in that if the intensity is made too large, the information recording layer will be damaged. If the linear velocity therefore changes dramatically, differences in sensitivity occur at the disc information recording layer, and recording/playback cannot be carried out in an efficient manner.

Zone CAV (modified CAV) discs and zone CLV discs have therefore been suggested as improvements because CAV and CLV discs have both good points and bad points.

In zone CAV discs, disc data recording regions are divided into a plurality of sections. The sector number is therefore increased for every one track (one rotation) for zones towards the outer periphery when compared to inner zones.

The zone CAV disc then usually rotates at a constant angular velocity regardless of the position on the radius of the access point as shown in FIG. 1. As a result, the linear velocity is proportional to the position on the radius as shown in FIG. 2.

In FIG. 3, with zone CAV discs, the linear density is changed within the zone in such a manner as to be smaller at the inner periphery side than at the outer periphery side, but the width of this change is the same for each zone. Further, the clock frequency is constant within each zone but is of a higher frequency at zones towards the outer periphery than at zones towards the inner periphery.

Further, the disc data recording region is also divided into a plurality of zones for zone CLV discs. As shown in FIG. 4, at each zone, the disc is rotated at a constant angular velocity but the rotational velocity is controlled in such a manner as to be slower for outer zones when compared with inner zones, i.e., the rotational velocity has a relationship that is approximately inversely proportional to the position on the radius.

The linear velocity of the zone CLV disc becomes slower within each zone when going from the inner periphery to the outer periphery as shown in FIG. 5, but the width of the change is smaller for zones on the outer periphery side than for zones on the inner periphery side.

The clock frequency of the zone CLV disc is constant regardless of the position on the radius, as shown in FIG. 6, and the linear density at each zone is of a smaller value for zones towards the outer periphery side than for zones towards the inner periphery side. The width of the change is therefore smaller for zones towards the outer periphery side when compared to zones towards the inner periphery side.

However, access time for zone CLV discs is substantial particularly when the zone number is large because the number of rotations is changed for each zone.

Recently, a method where a plurality of sectors is taken as error correction blocks to be taken as recording/playback units in order to remove a substantial amount of redundancy due to error correction etc. so that data can be recorded and played-back at a high density has been proposed. In this case, the recording/playback units are also made large in order to make the error correction length large. Because of this, the zoning efficiency at the zone CAV disc also deteriorates since the zone number cannot be made large and the capacity cannot be increased to a great extent.

SUMMARY OF THE INVENTION

As the present invention sets out to resolve these kind of problems, it is the object of the present invention to provide an invention capable of recording and playing back data at a higher density without the access time becoming longer.

The recording/playback device of the present invention comprises a reader for reading track numbers of access points of the disc, a storage unit for storing the track numbers and the zones in such a manner that the track numbers of each of the zones correspond to an integer multiple of a number of a plurality of the data units comprising recording or playback units, a determining unit for determining the zone for which the track number read by the reader belongs to by referring to a table for the storage unit and controller for controlling recording and playing back of the data in accordance with determination results of the determining unit.

The recording/playback method of the present invention comprises the steps of reading track numbers of access points of the disc, determining a zone corresponding to a track number read from a table of the track numbers and zones provided in such a manner that the track numbers of each of the zones correspond to an integer multiple of a number of a plurality of the data units comprising recording or playback units and controlling recording and playing back the data in such a manner as to correspond to results of the determination.

With the disc of the present invention, the number of tracks for each of the zones is set to be an integer number of times of the number of a plurality of the data units comprising recording or playback units.

The recording/playback device of the present invention comprises a reader for reading track numbers of access points of the disc, a storage unit for storing a table of the track numbers and bands in such a manner as to correspond to the plurality of the zones comprising the bands, a determining unit for determining the zone for which the track number read by the reader belongs to by referring to the table of the storage unit and a controller for controlling the rotation of the disc in such a manner as to be of a fixed angular velocity within the bands and so that different bands have different angular velocities, in accordance with determining unit results of the determination.

The recording/playback method of the present invention comprises the steps of reading track numbers of access points of the disc, determining which band a track number read from a table of the track numbers and bands made to correspond with a plurality of the zones comprising the bands belongs to and controlling the rotation of the disc in such a manner as to be of a fixed angular velocity within the bands and so that different bands have different angular velocities, in accordance with determination results of the determination.

The disc of the present invention comprises regions for recording data being divided into a plurality of zones and a number of data units per one revolution of an outer periphery side zone of a neighboring two of the zones being set to be a larger value than a number of the data units per one revolution of the inner periphery side zone of the pair of zones, wherein bands comprise pluralities of the zones, with angular velocity being fixed within the bands and rotation being carried out at different angular velocities for different the bands.

With the recording/playback device, recording/playback method and the disc of the present invention, the track number for the zones are inter multiples of the number of the plurality of data units comprising the units for recording or playing back.

With the recording/playback device, recording/playback method and the disc of the present invention, bands are comprised of pluralities of zones, with the angular velocity being constant within bands and with different bands being rotated at different angular velocities.

BRIEF DESCRIPTION OF THE DRAWINGS

FIG. 19 is a view illustrating parameters for each of the zones.

FIG. 20 is a view illustrating parameters for each of the zones.

FIG. 21 is a view illustrating parameters for each of the zones.

FIG. 22 is a view illustrating parameters for each of the zones.

FIG. 42 is a view illustrating the parameters when dividing into four bands.

FIG. 43 is a view illustrating parameters in the case of dividing into four bands.

FIG. 44 is a view illustrating parameters in the case of dividing into four bands. and FIG. 45 is a view illustrating parameters in the case of dividing into four bands.

DETAILED DESCRIPTION OF THE PREFERRED EMBODIMENT

Embodiment

Figure 1:
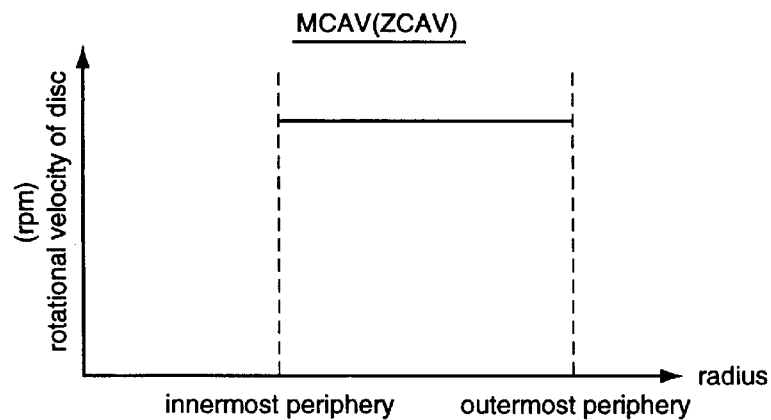
FIG. 1 is a view illustrating the rotational velocity of a disc in a related zone CAV method.
Figure 2:
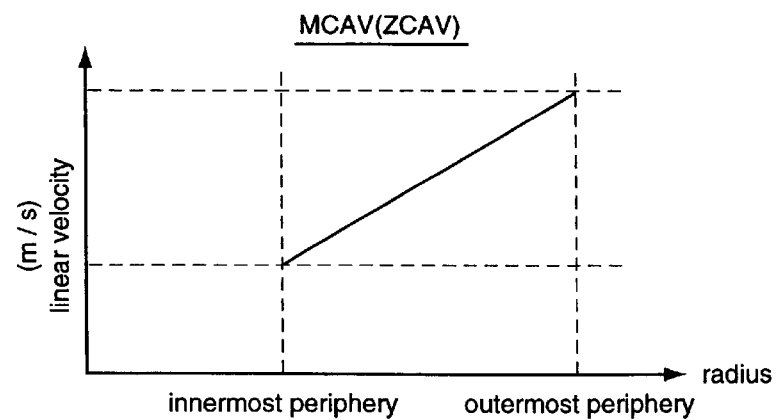
FIG. 2 is a view illustrating the linear velocity in the zone CAV method.
Figure 3:
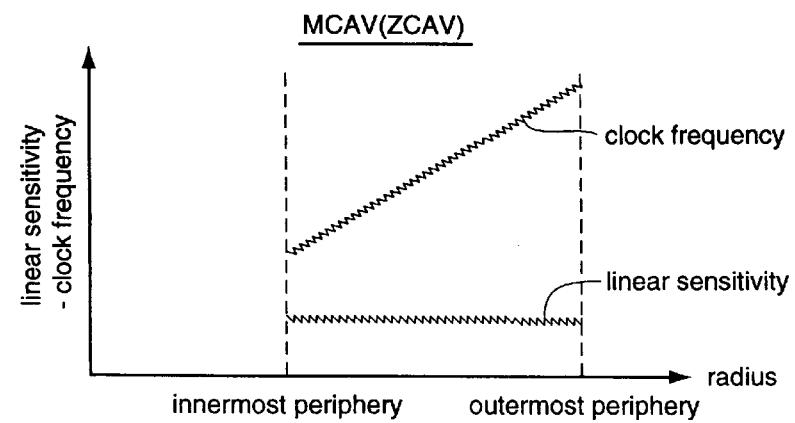
FIG. 3 is a view illustrating linear density and clock frequency in the zone CAV.
Figure 4:
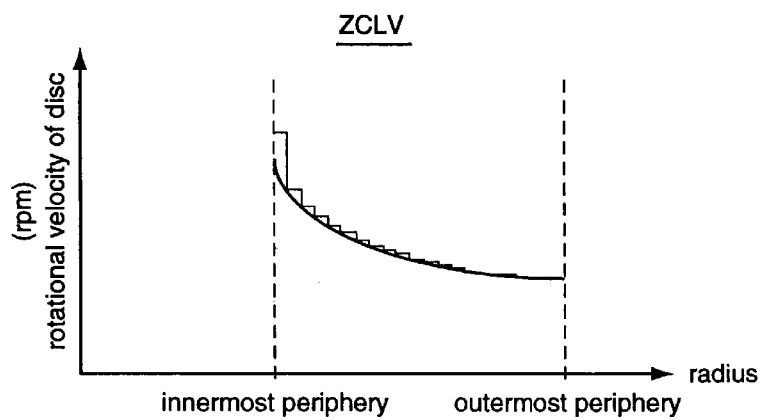
FIG. 4 is a view illustrating rotational velocity of a disc in zone CLV.
Figure 5:
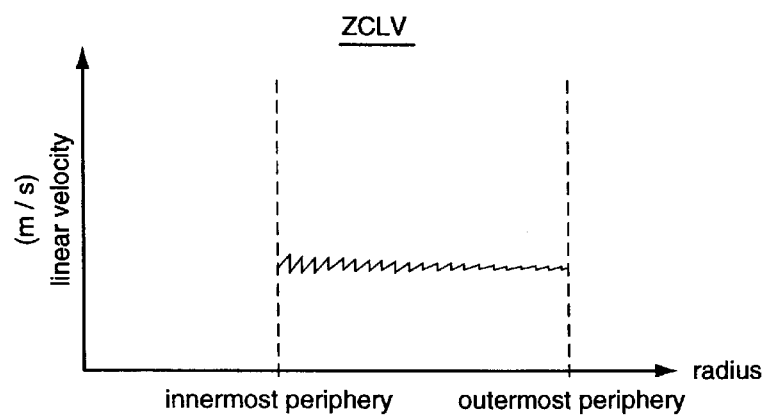
FIG. 5 is a view illustrating linear velocity in zone CLV.
Figure 6:
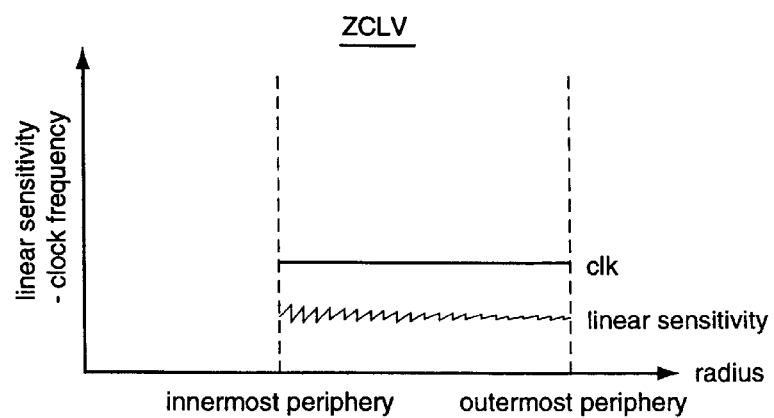
FIG. 6 is a view illustrating linear velocity and clock frequency in zone CLV.
Figure 7:
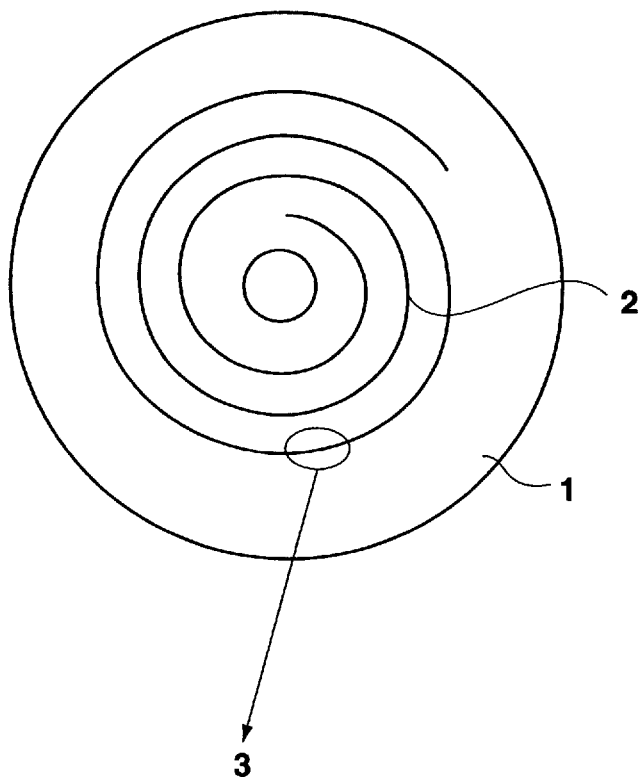
FIG. 7 shows an example of configuration of an optical disc of the present invention.

FIG. 7 shows a configuration of an optical disc employing the disc of the present invention. As shown in FIG. 7, a pregroove 2 is pre-formed on the disc (optical disc) 1 in a spiral-shape going from the inner periphery to the outer periphery. It is, of course, also possible for this pregroove 2 to be formed with the same concentric shapes.

Figure 8:
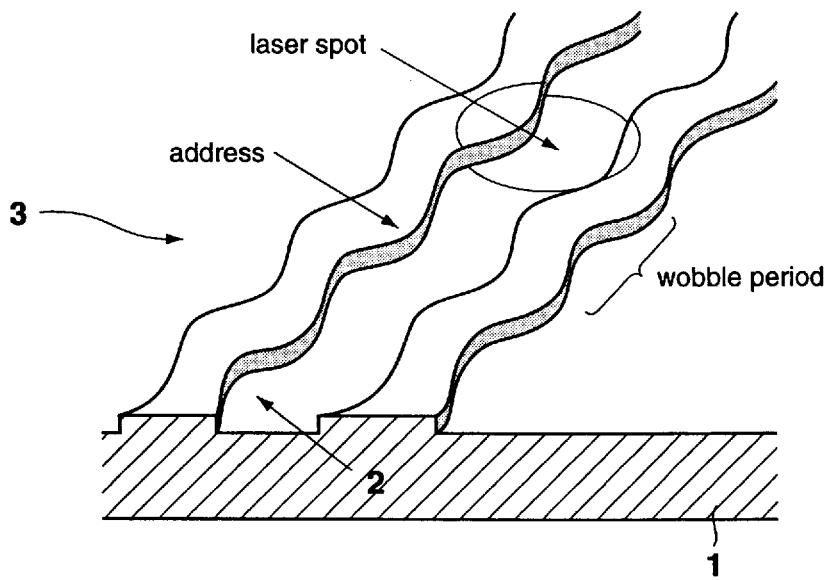
FIG. 8 is a view illustrating wobbling conditions for a disc of the present invention.

The left and right side walls of the pregroove 2 wobble in accordance with the address information so as to zig-zag in accordance with the frequency modulation wave, as shown by the enlarged portion of FIG. 8. One track therefore has a plurality of wobbling address frames.

Figure 9:
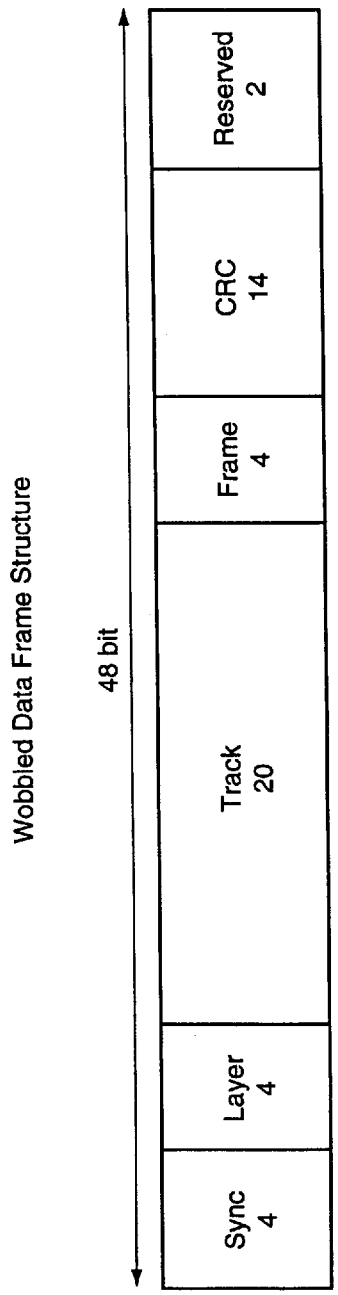
FIG. 9 is a view showing an example configuration of a wobbling address frame.

FIG. 9 shows the configuration (format) of the a wobbling address frame. In FIG. 9, the wobbling address frame comprises 48 bits, with the first four bits being for a synchronization signal (Sync) showing the start of the wobbling address frame. The next four bits are for a layer (Layer) displaying which layers of the plurality of layers are present, with the following 20 bits being for the track address (track number). The next four bits then show the address frame frame number. The following 14 bits are then for error correction code (CRC) and are recorded with error correction code for data excluding the synchronization signal (Sync). The final two bits (Reserved) are then reserved for the future.

The wobbling address frame is, for example, an eight address frame portion per one track (revolution) recorded on CAV discs for which the rotational angular velocity is constant. The values of, for example, 0 to 7 are therefore recorded as the frame numbers of FIG. 9.

Figure 10:
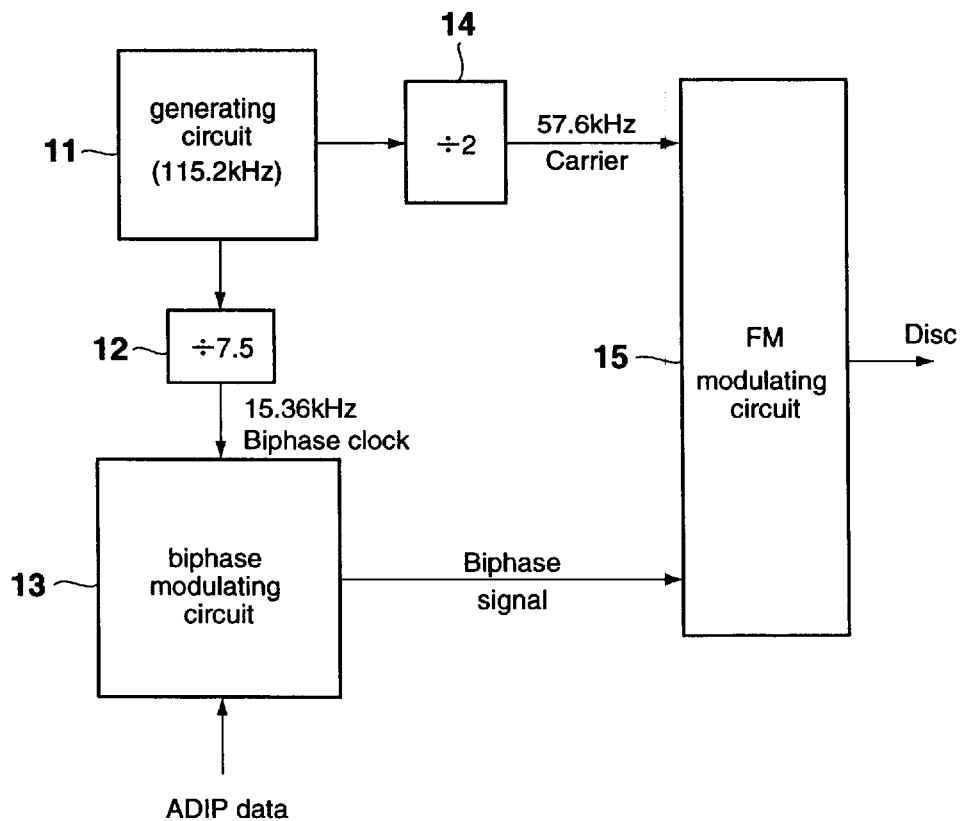
FIG. 10 is a view showing an example configuration of a wobbling signal generating circuit.

FIG. 10 is an example configuration of a wobbling signal generating circuit for generating a wobbling signal for wobbling the pregroove 2 corresponding to an address frame of the format shown in FIG. 9. A generating circuit 11 generates a signal having a frequency of 115.2 kHz. The signal generated by the generating circuit 11 is supplied to a dividing circuit 12 and divided by a value of 7.5 before being supplied to a biphase modulating circuit 13 as a biphase clock signal at a frequency of 15.36 kHz. ADIP (Address In Pre-groove) data of the frame format shown in FIG. 9 is also supplied to the biphase modulating circuit 13.

The biphase modulating circuit 13 biphase modulates a biphase clock supplied by the divider 12 using the ADIP data (address data) supplied from a circuit not shown in the drawings and the biphase signal is then outputted to an FM modulating circuit 15. A carrier signal with a frequency of 57.6 kHz obtained by dividing the 115.6 kHz signal generated by the generating circuit 11 by the value 2 at a divider 14 is inputted at the FM modulating circuit 15. The FM modulating circuit 15 then frequency modulates the carrier signal inputted by the divider 14 using the biphase signal inputted by the biphase modulating circuit 13 and outputs the frequency-modulated signal obtained from these results. The left and right side walls of the pregroove 2 of the disc 1 are formed (wobbled) so as to correspond to this frequency-modulated signal.

Figure 11:
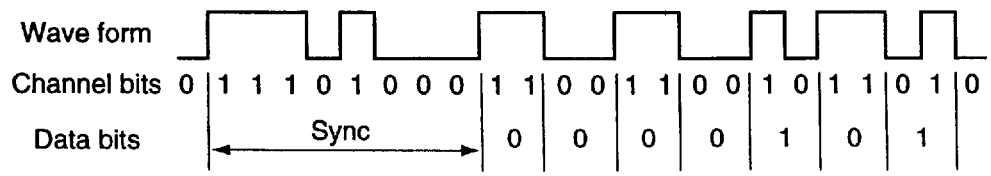
FIG. 11 is a view showing an example of a biphase signal outputted by the biphase modulating circuit 13 of FIG. 10.
Figure 12:
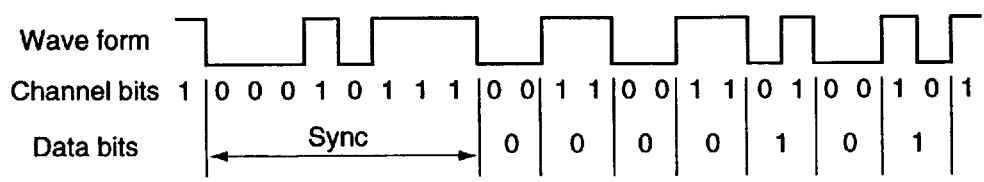
FIG. 12 is a view showing a further example of a biphase signal outputted by the biphase modulating circuit 13 of FIG. 10.

FIG. 11 and FIG. 12 show examples of biphase signals outputted by the biphase modulating circuit 13. In this embodiment, "11101000" is used as the synchronization pattern (SYNC) when the leading bit is zero, as shown in FIG. 11, and the opposite "00010111" of that shown in FIG. 11 is used as the synchronization pattern when the leading bit is one, as shown in FIG. 12. SYNC is a unique pattern falling outside specifications that does not appear in modulation.

Of the data bits (Data Bits) for the address data (ADIP data), "0" is biphase modulated and converted to the channel bits (Channel Bits) "11" (when the previous channel bit is "0") or "00" (when the previous channel bit is "1"). Further, "1" is converted to the channel bits "10" (when the previous channel bit is "0") or "01" (when the previous channel bit is "1"). Which one of the two patterns is converted depends on the previous code. i.e., the waveforms of FIG. 11 and FIG. 12 are shown in such a manner that the patterns for the channel bits 1 and 0 are shown with 1 as the high level and 0 as the low level, with either of the two patterns being selected in order to keep this waveform continuous.

Figure 13:
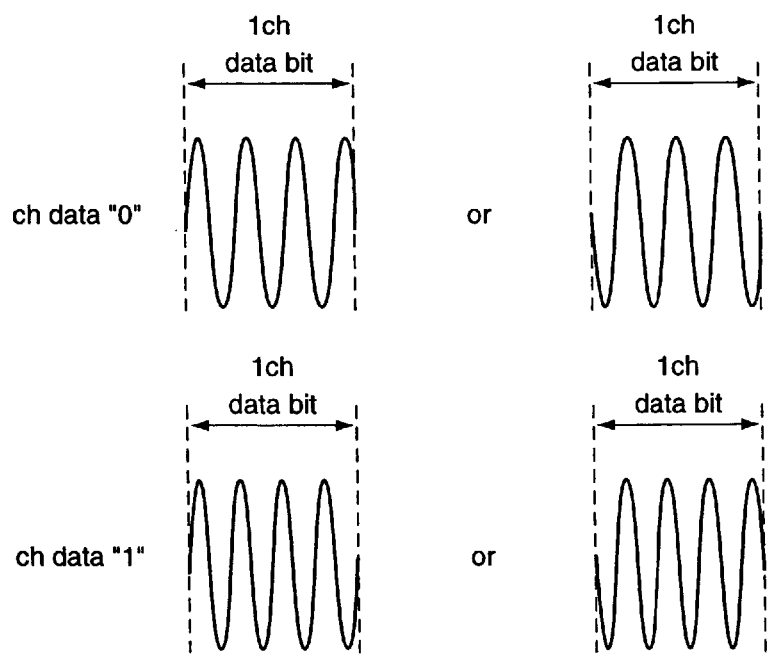
FIG. 13 is a view illustrating frequency modulation carried out by the FM modulating circuit 15 of FIG. 10.

The FM modulating circuit 15 frequency-modulates the carrier signal supplied by the divider 14 in the manner shown in FIG. 13 so as to correspond to the biphase signals shown in FIG. 11 and FIG. 12.

Namely, when the channel bit data (biphase signal) is "0", the FM modulating circuit 15 outputs 3.5 waves of carrier signal in a period corresponding to the length of half of one data bit, with this 3.5 waves of carrier signal starting from a positive half-wave or a negative half-wave.

With regards to this, when the channel bit data (biphase signal) is "1", four waves of carrier signal are outputted in a period corresponding to the length of half of one data bit. This four waves of carrier signal is also taken as starting from a positive half-wave or a negative half-wave.

The FM modulating circuit 15 therefore outputs 7 (=3.5+3.5) frequency modulated waves in a period corresponding to the length of one data bit when channel data bits 00 corresponding to data 0 are inputted, and outputs 8 (=4+4) frequency modulated waves when channel data bits 11 are inputted. Further, 7.5 (=4+3.5=3.5+4) frequency modulated waves are outputted when channel data bits 10 or 01 corresponding to the data 1 are inputted.

The 57.6 kHz carrier signal inputted to the FM modulating circuit 15 corresponds to 7.5 waves. The FM modulating circuit 15 then generates this 7.5 wave carrier signal and a seven or eight wave frequency modulated wave shifted by +/−6.67% (=0.5/7.5) with respect to the 7.5 wave carrier signal in accordance with the data.

As described above, the carrier signal continuing on from the previous signal is selected from a carrier signal starting from a positive half-wave and a carrier signal starting from a negative half-wave in accordance with the channel data 0 and the channel data 1.

Figure 14:
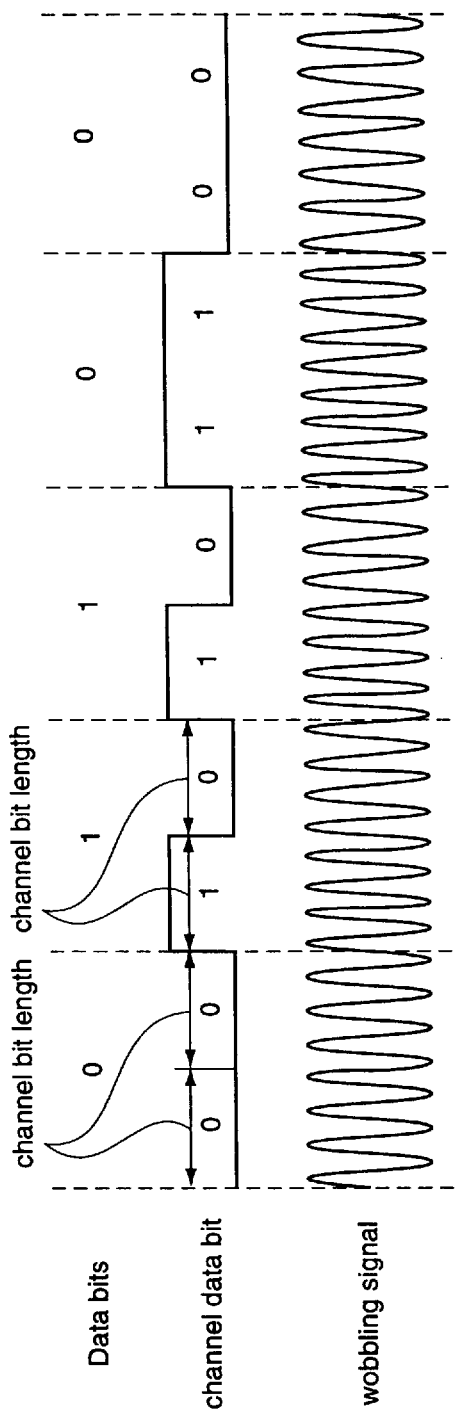
FIG. 14 is a view showing the frequency modulated wave outputted by the FM modulating circuit 15 of FIG. 10.

FIG. 14 shows an example of a frequency modulated wave outputted by the FM modulating circuit 15 in this manner. In this example, the initial data bit is taken to be 0, with the channel data bits for this being 00. A 3.5 wave carrier signal starting from a positive half-wave start-point is selected for the first channel data bit 0. As a result, the end point of this carrier ends at a positive half-wave. Then, 3.5 waves starting from a negative half-wave is then selected for the following channel data bit 0 giving a total of seven waves of frequency modulated wave for the data bit 0.

The data bit 1 (channel bit 10) continues on after this data bit 0. A waveform starting from a positive half-wave is selected as a four wave carrier signal for the first channel data bit 1 corresponding to the data bit 1 because the 3.5 waves for the channel data bit 0 corresponding to the previous data bit 0 ends on a negative half-wave. A waveform starting from a positive half-wave is selected as the four waves for the following channel data bit 0 because the four waves for the channel data bit 1 end on a negative half-wave.

Similarly, the carrier signals for the 7.5 wave, 8 wave and 7 wave carrier signals corresponding to the data bit 1 (channel data bits 10), data bit 0 (channel data bits 11) and data bit 0 (channel data bits 00) are outputted as waveforms that are continuous at the boundary portions (start points and end points) of the data bits.

In this embodiment, as shown in FIG. 14, the channel bit length is of a length that is an inter number of times of half of the carrier wavelength, i.e., the channel bit length is taken to be of a length half the wavelength for the seven wave carrier (frequency modulating wave) and taken to be eight times the length of half the eight wave carrier (frequency modulating wave). Further, the channel bit length is taken to be seven times half of the carrier wavelength for 7.5 waves (when the channel bit is 0) and eight times (when the channel bit is 1).

In this embodiment, the boundary parts (start point and end point) of the biphase-modulated channel bits are provided in such a manner as to become the zero cross-points of the frequency modulated wave. As a result of this, the phases of the address data (channel bit data) and the frequency modulated waves coincide, recognition of the boundary parts of the bits becomes simple and address data bit error detection is avoided, with it then being simple to playback address information in an accurate manner as a result.

Further, in this embodiment, the boundary points of the data bits (start points and end points) and the edges (zero cross-points) of the frequency modulating wave are made to correspond. The clock is therefore generated taking the edges of the frequency modulating wave as a reference. However, in this embodiment, the clock is generated taking a clock synchronization mark as a reference, as described later with reference to FIG. 16A through FIG. 16D.

Figure 15:
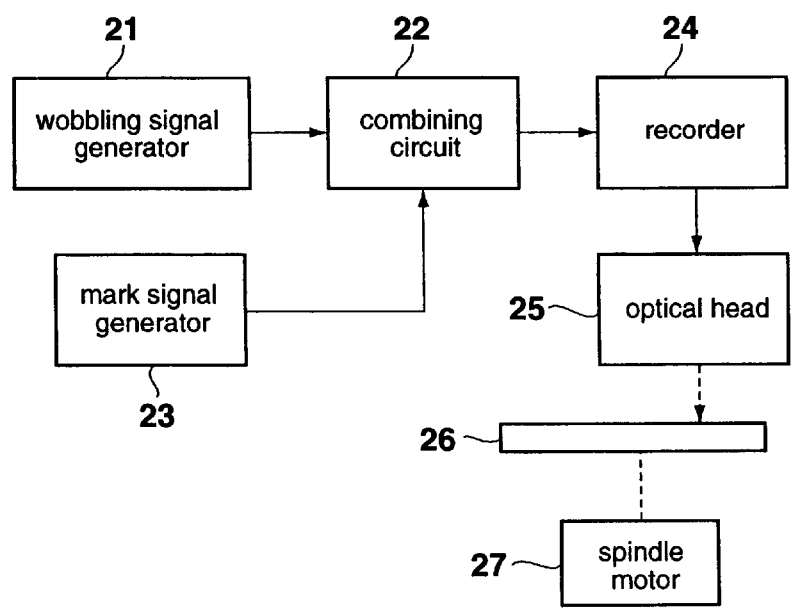
FIG. 15 is a view showing an example configuration of a recording device for making a disc 1 having a pregroove.
Figure 16:
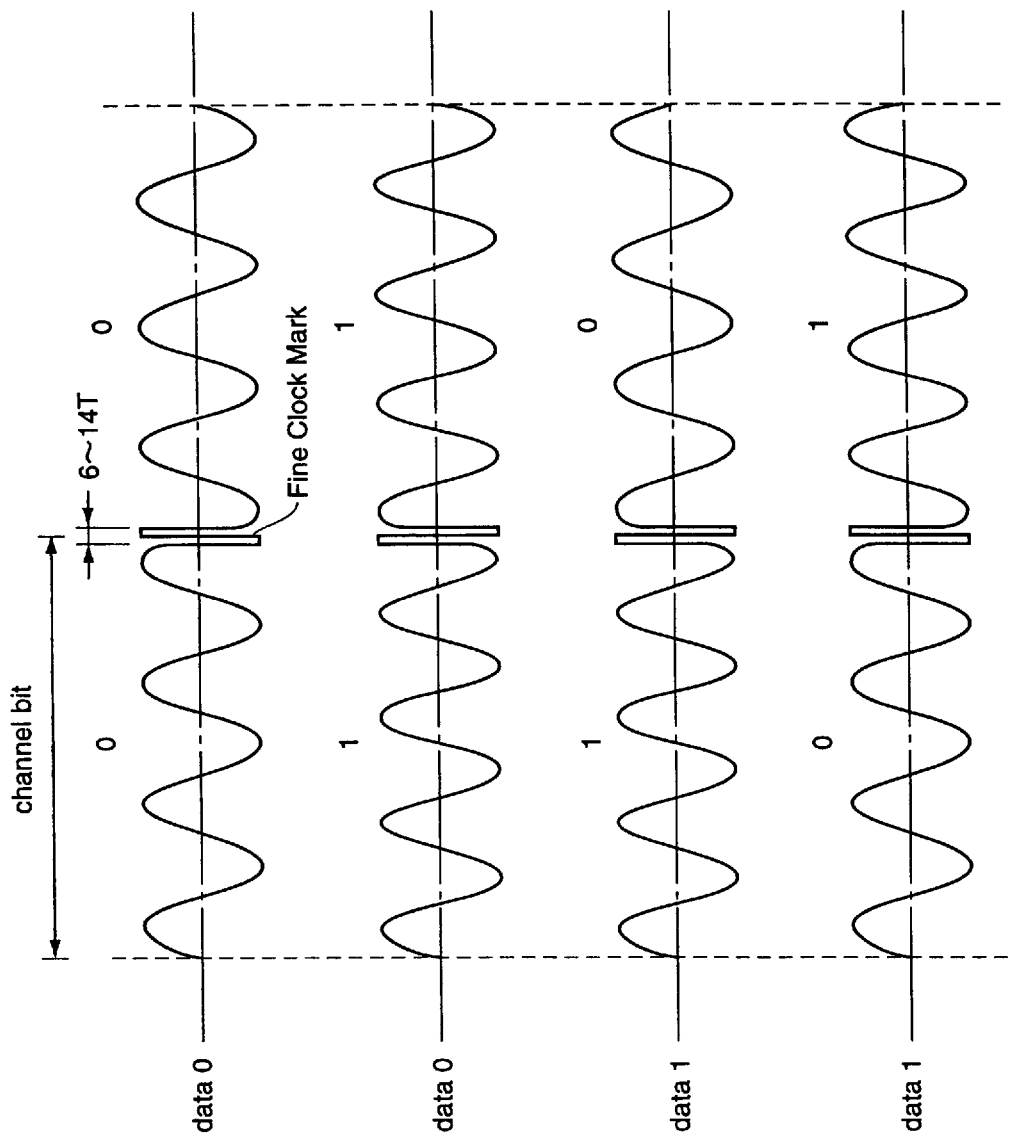
FIG. 16A through FIG. 16D are views illustrating the operation of the combining circuit 22 of FIG. 15.

FIG. 15 shows an example configuration of a recording device (disc forming device) for making discs 1 having pregrooves. A wobbling signal generator 21 has the configuration shown above in FIG. 10 and supplies the frequency modulating signal outputted by the FM modulating circuit 15 to a combining circuit 22. A mark signal generator 23 generates a clock synchronization mark signal at a prescribed timing and outputs this to the combining circuit 22. The combining circuit 22 then combines the frequency modulating signal outputted by the wobbling signal generator 21 and the clock synchronization mark signal outputted by the mark signal generator 23 and outputs this to a recording circuit 24.

When a clock synchronization mark signal is provided, the combining circuit 22 combines this clock synchronization mark (Fine Clock Mark) with a carrier supplied by the wobbling signal generator 21, as shown in FIG. 16A through FIG. 16D. The length of the clock synchronization mark can then be taken to be 6 to 14T (where T is the bit cell length) when the recording/playback data modulation is taken to be the EFM (Eight To Fourteen Modulation: (8–14) modulation)+of Digital Video Discs, etc.

Namely, as shown in FIG. 16A through FIG. 16D, when the channel bit data is 00 (data 0), 11 (data 0), 10 (data 1) or 01 (data 1), a clock synchronization mark of a higher frequency than the address information modulation frequency (57.6 kHz) is combined at the zero cross-points for the carriers at the centers (channel bit changeover points) of the respective items of data. This clock synchronization mark is recorded every data bit or every prescribed number of data bits.

In this manner, amplitude fluctuations in the clock synchronization mark become less and their detection becomes simple by inserting clock synchronization marks at the zero cross-points for the wobbling frequency modulating wave corresponding to the center (channel data bit changeover points) of the address data bits.

Namely, in the FM modulation circuit 15, when frequency modulation is carried out in such a manner that the frequency is modulated so as to be offset from the central frequency by just −5% when the channel data bit is 0 and by +5% when the channel data bit is 1, the boundary parts of the channel data or the channel data bits and the zero cross-point of the frequency modulating waves do not coincide and errors can be easily detected in the channel data bits (or the data bits). Further, the position where the clock synchronization mark is inserted is never made to be the zero cross-point and is superimposed at a point of the frequency-modulated wave having a prescribed amplitude value. As a result, the level of the clock synchronization mark is increased or decreased by just this amplitude value and, detection, therefore, becomes difficult. However, according to this embodiment, this detection (identification of the frequency-modulating wave) becomes easy because a clock synchronization mark is arranged at the zero cross position of the frequency modulating wave.

The recording circuit 24 controls an optical head 25 so as to correspond with the signal provided by the combining circuit 22 and generates laser light for forming pregrooves (including clock synchronization marks) on an original disc 26. A spindle 27 then causes the original disc 26 to rotate at a constant angular velocity (CAV).

In other words, the frequency modulating signal generated by the wobbling signal generator 21 is combined with the clock synchronization mark signal outputted by the mark signal generator 23 at the combining circuit 22 and then inputted to the recording circuit 24. The recording circuit 24 then controls the optical head 25 so as to correspond with the signal inputted by the combining circuit 22 and generates laser light. The laser light generated by the optical head 25 is then shone on the original disc 26 which is rotated at a constant angular velocity by the spindle motor 27.

The original disc 26 is developed, a stamp is made from the original disc 26 and discs 1 are then made as a large number of replicas from the stamp so that the discs 1 are obtained formed with the pregroove 2 having the aforementioned clock synchronization marks.

Figure 17:
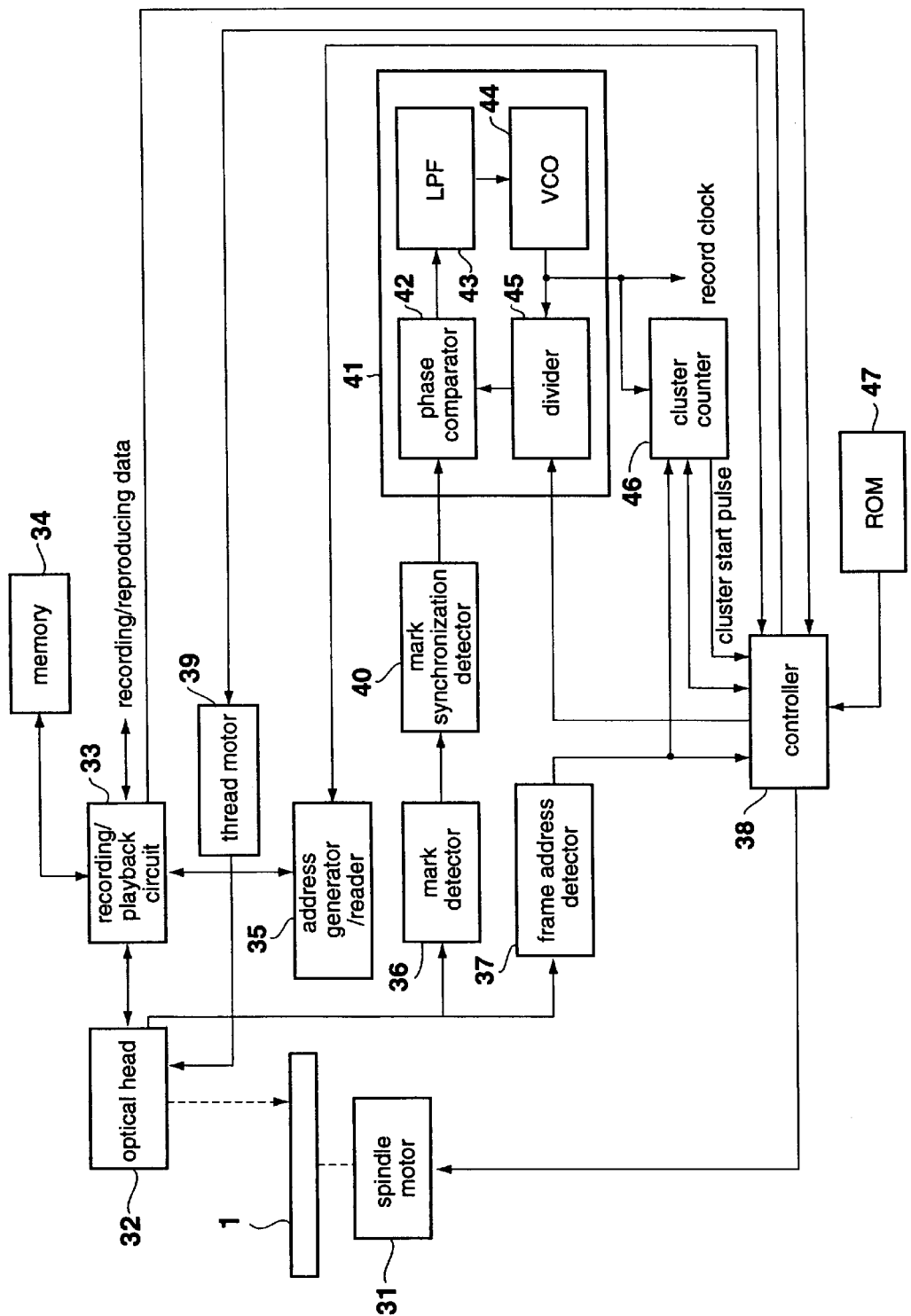
FIG. 17 is a block diagram showing an example configuration of an optical disc recording/playback device to which the recording/playback device of the present invention is applied.

FIG. 17 shows an example configuration of an optical disc recording/playback device for recording or playing back data to/from the discs 1 obtained in this manner. A spindle motor 31 rotates the disc 1 at a prescribed angular velocity. An optical head 32 illuminates the disc 1 with laser light and records data on the disc 1, as well as playing back data from the reflected light. A recording/playback circuit 33 temporarily records data inputted from a device not shown in the drawings in a memory 34. When the data is stored in the memory 34 in recording units of one cluster portions (or one sector portion of data) data for this one cluster portion is read-out, modulated using a prescribed method and outputted to the optical head 32. The recording/playback circuit 33 then demodulates the data inputted by the optical head 32 and outputs this to a device not shown in the drawings.

An address generator/reader 35 generates data address (sector address) (described later with reference to FIG. 24) recorded within the track (pregroove 2) under the control of a controller 38 and outputs this address to the recording/playback circuit 33. The recording/playback circuit 33 then adds this address to recording data supplied from a device not shown in the drawings and outputs this to the optical head 32. When address data is included within playback data played-back from a track of the disc 1 by the optical head 32, the recording/playback circuit 33 separates this address data and outputs this address data to the address generator/reader 35. The address generator/reader 35 then outputs the read-out address to the controller 38.

A mark detector 36 detects components corresponding to the clock synchronization mark from the RF signal played back and outputted by the optical head 32. A frame address detector 37 reads out address information (track number and frame number of FIG. 9) included in the wobbling signal from the RF signal outputted by the optical head 32 and supplies this information to a cluster counter 46 and the controller 38.

A mark synchronization detector 40 determines the periodicity of a detection pulse outputted when the mark detector 36 detects a clock synchronization mark, i.e., because the clock synchronization mark is generated with a fixed period, a determination is made as to whether or not the detection pulse inputted by the mark detector 36 is a detection pulse generated with this fixed period. If this is a detection pulse generated with this fixed period, a pulse synchronous with this detection pulse is generated and outputted to a phase comparator 42 of a following stage PLL circuit 41. Further, the mark synchronization detector 40 generates a pseudo pulse at a prescribed timing when a detection pulse is not inputted for a fixed period of time so that the following stage PLL circuit 41 does not lock to an erroneous phase.

As well as the phase comparator 42, the PLL circuit 41 also has a low-pass filter (LPF) 43, a Voltage Controlled Oscillator (VCO) 44 and a divider 45. The phase comparator 42 compares the phase of input from the mark synchronization detector 40 and input from the divider 45 and outputs the phase difference. The low-pass filter 43 smoothes the phase difference signal outputted by the phase comparator 42 and outputs this to the VCO 44. The VCO 44 generates a clock of a phase corresponding to the output of the low-pass filter 43 and outputs this to the divider 45. The divider 45 divides a clock inputted by the VCO 44 by a prescribed value (value specified at the controller 38) and outputs the divided results to the phase comparator 42.

The clock outputted by the VCO 44 is supplied to each circuit as well as to the cluster counter 46. The cluster counter 46 counts the number of clocks outputted by the VCO 44 taking the frame address supplied by the frame address detector 37 as a reference and generates a cluster start pulse that is outputted to the controller 38 when the count value reaches a preset prescribed value (a value corresponding to the length of one cluster).

The thread motor 39 is controlled by the controller 38 so that the optical head 32 is moved to a prescribed track position of the disc 1, with the controller 38 controlling the spindle motor 31 so that the disc 1 rotates at a prescribed angular velocity (CAV).

A table stipulating the corresponding relationship between the track numbers within the address frames (FIG. 9) and the zones into which the data recording regions of the disc 1 are divided and, when necessary, a table stipulating the relationship between zones and the band to which a zone corresponds (the details of which are described later) are stored at a ROM 47.

Figure 18:
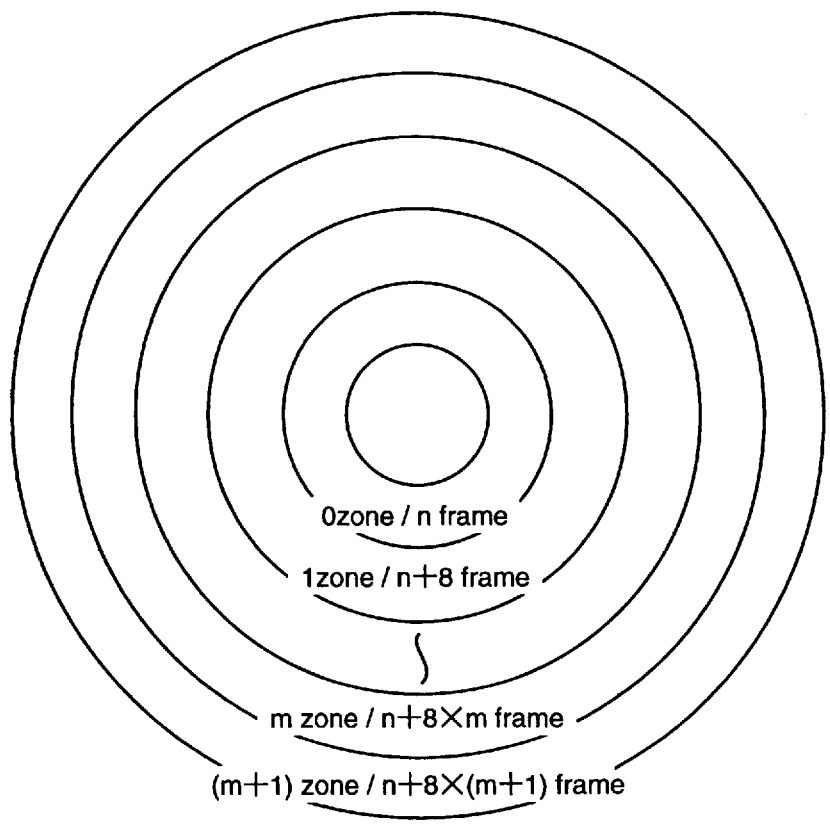
FIG. 18 is a view illustrating zones occurring on a disc.

Namely, the controller 38 records and plays back data by dividing the disc 1 into a plurality of zones (in the case of this embodiment, the 0th to (m+1)th zones, giving a total of (M+2)th zones) as shown in FIG. 18. When the number of data frames (this data frame differs from the address frame described with reference to FIG. 9 and is in data block units) per one track of the 0th zone is taken to be n, the following 1st zone is then taken to a number of data frames per one track of n+8. Similarly, the number of data frames for zones towards the outside increases by eight when compared to a neighboring inner side zone, with the number of data frames for the outermost (m+1)th zone then being n+8×(m+1).

The first zone is changed over to from the position on the radius where the capacity for the n+8th frame can be obtained, at the same linear density as at the innermost periphery of the 0th zone. The mth zone is then gone to from the position on the radius at which the n+8×mth frame capacity can be obtained at the same linear velocity as at the innermost periphery of the 0th zone.

For example, when the radius of the disc 1 is taken as a recording/playback area of a range from 24 mm to 58 mm, the track pitch is taken as 0.87 $\mu$m and the linear density is taken to be 0.38 $\mu$m/bit, the recording/playback area is divided into 93 zones, as shown in FIG. 19 to FIG. 22. At the 0th zone of disc radius 24 mm, there are 520 frames per one track (one rotation), with an increase of eight frames per track as the zone is incremented by one.

As described later, one sector comprises 26 frames (data frames), with the number of frames incremented every zone (=8) being set to a value smaller than the number of frames comprising one sector (=26). As a result, a larger number of zones can be formed using smaller units and the capacity of the disc 1 can therefore be made large. This system is referred to as zone CLD (Constant Linear Density).

In FIG. 19 to FIG. 22, each string of data shows the zone number, the number of frames per track radius, the number of tracks per zone, the number (cluster number) of recording/playback units (blocks) per one zone, the lowest linear density within this zone, the capacity of this zone, the rotational velocity of this zone, the minimum linear velocity for this zone and the maximum linear velocity for this zone. The rotational velocity shows the number of rotations per minute when the data transfer rate is 11.08 Mbps.

In this embodiment, the track number occurring at each zone is fixed at 420, with this track number being taken to be the same value as the frame number for a single recording/playback unit (ECC block frame number, described in the following with reference to FIG. 27).

In this embodiment, the number of tracks for each zone has been taken as the number of data frames comprising a recording/playback unit (420 frames) but this can also be taken to be an integral number of times. As a result, leftover data frames no longer occur, an integral number of recording/playback units (blocks) are provided at each of the zones and the zoning efficiency is raised. A capacity close to that of zone CLV that is larger than the zone CAV and smaller than the zone CLV can be obtained.

By carrying out near CLV zoning in this manner, the change in clock frequency occurring between one zone and the next is small, clock extraction is possible between zones where the clock frequency changes even in the case of playback from a CLV-dedicated playback device and playback can be continuous between zones.

Next, a description is given of the embodiment of FIG. 17, with a description being given of the operation during data recording. The optical head 32 shines laser light onto the optical disc 1 and an RF signal obtained from the reflected light is outputted. The frame address detector 37 reads wobbling information (address information) from this RF signal, with these read results being supplied to the controller 38 and the cluster counter 46. Further, the wobbling information is also inputted to the mark detector 36 where the clock synchronization mark is detected and supplied to the mark synchronization detector 40.

The mark synchronization detector 40 determines the periodicity of the clock synchronization mark, generates a corresponding prescribed pulse and outputs this to the PLL circuit 41. The PLL circuit 41 then generates a clock (recording clock) synchronous with this pulse and outputs this clock to the cluster counter 46.

The controller 38 detects the position of the reference clock synchronization mark occurring at one track (one rotation) from a frame address (frame number) supplied by the frame address detector 37. It is therefore possible, for example, to access an arbitrary position (arbitrary position within one revolution) on the track using the recording clock count value taking the clock synchronization mark detected first for the frame (address frame) of frame number 0 as a reference.

Figure 23:
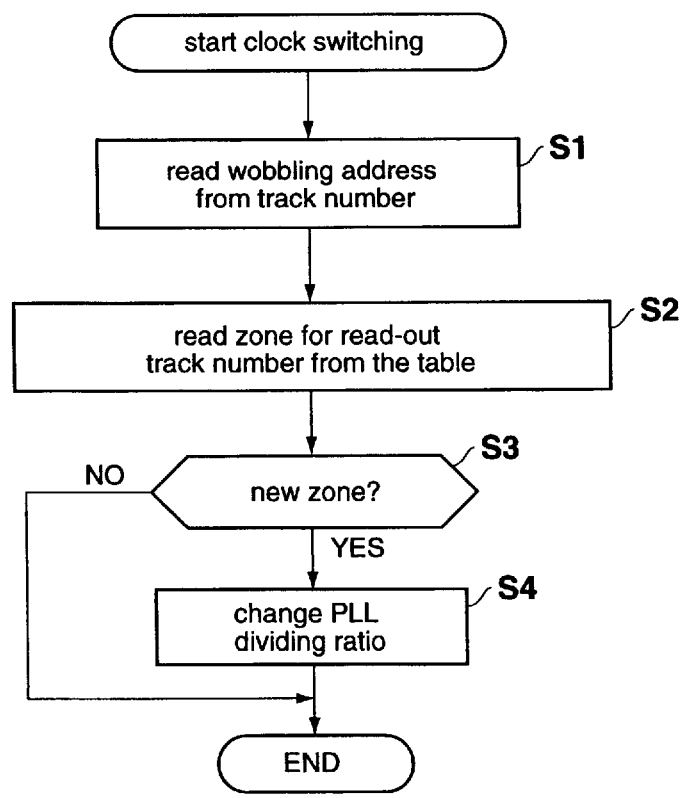
FIG. 23 is a flowchart illustrating the clock changeover process of the embodiment of FIG. 17.

When an arbitrary position on a track is accessed, a determination is made as to which zone this access point belongs and it is necessary for a clock of a frequency corresponding to this zone to be generated at the VCO 44. The controller 38 then executes the clock changeover process shown in the flowchart of FIG. 23.

First, in step S1, the controller 38 reads the track number from within the frame address for the access point outputted by the frame address detector 37. Then, in step S2, a zone corresponding to the track number read in step S1 is read from a table stored in the ROM 47. As described above, which of the 0th to 92nd zones to which each of the tracks belong is pre-stored in a table in the ROM 47.

A determination is then made in step S3 as to whether or not the currently read track number is present at a new zone different to the zone that has been accessed up until this time. If it is determined that the zone is a new zone, step S4 is proceeded to and the controller 38 controls the divider 45 so as to be set to a dividing ratio corresponding to this new zone. In this manner, a different frequency recording clock is outputted from the VCO 44 every zone.

When it is determined in step S3 that the current zone is not a new zone, the process in step S4 is skipped, i.e., the dividing frequency of the divider 45 remains as is.

Next, a description will be given of the format of the recording data. In this embodiment, as described above, data is recorded in units of one cluster (32 kbytes) and these clusters are configured in the following manner.

Figure 24:
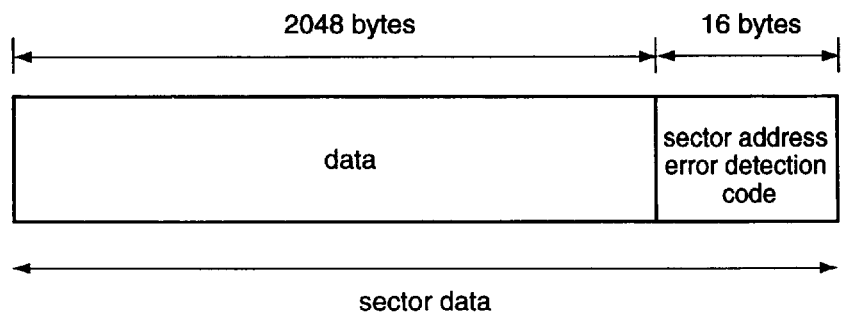
FIG. 24 is a view illustrating the format of one sector portion of data.

Namely, 2 kbytes (2048 bytes) of data are extracted as one sector portion of data, with a 16 byte overhead then being added to this data as shown in FIG. 24. This overhead includes sector addresses (addresses generated by the address generator/reader 35 of FIG. 17 or read addresses) and error detection code for detecting errors etc.

Figure 25:
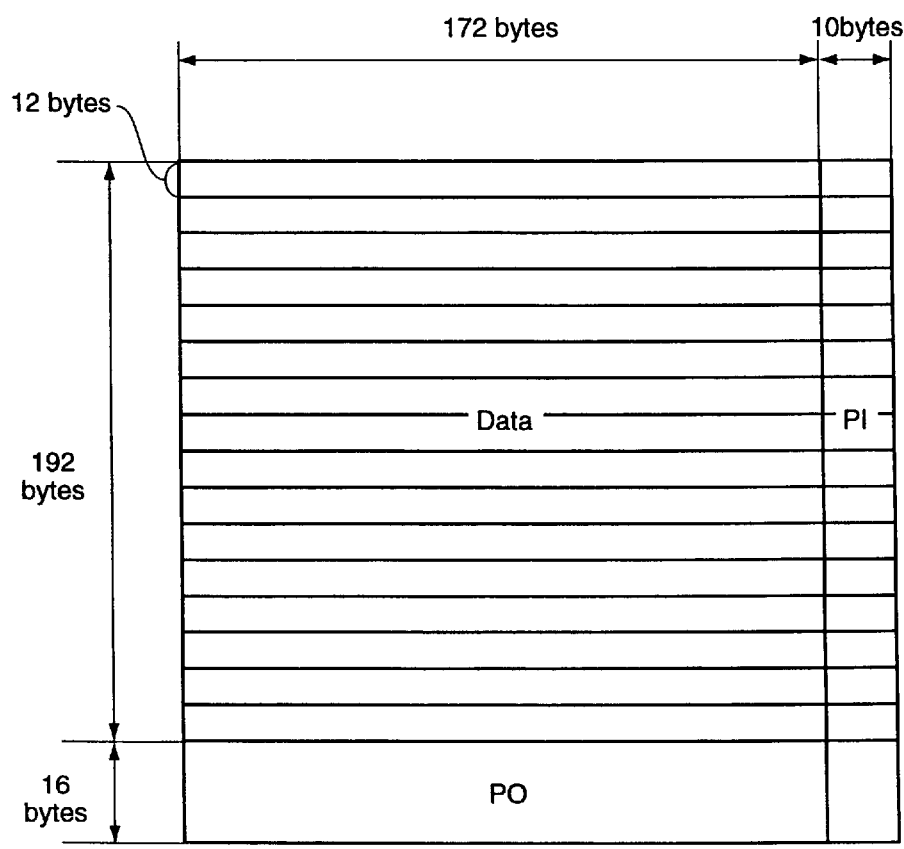
FIG. 25 is a view illustrating the configuration of 32 kbytes of data.

A total of 2064 (=2048+16) bytes of data are taken as 12×172 (=2064) bytes of data as shown in FIG. 25. Then, 16 of these one sector portions of data are gathered together and taken as 192 (=12×16)×172 bytes of data. Ten bytes of internal code (PI) and 16 bytes of external code (PO) are then added to each of the bytes in the horizontal and vertical directions for the 192×172 bytes of data for parity.

Further, the 16×182 bytes of external code (PO) of the data put into block form as 208 (=192+16)×182 (=172+10) bytes are separated into 16 items of 1×182 bytes of data and added one at a time under the 16 items of sector data of the 0th to 15th 12×182 bytes so as to be interleaved. The 13 (=12+1)×182 bytes of data are then taken to be one sector of data.

Figure 26:
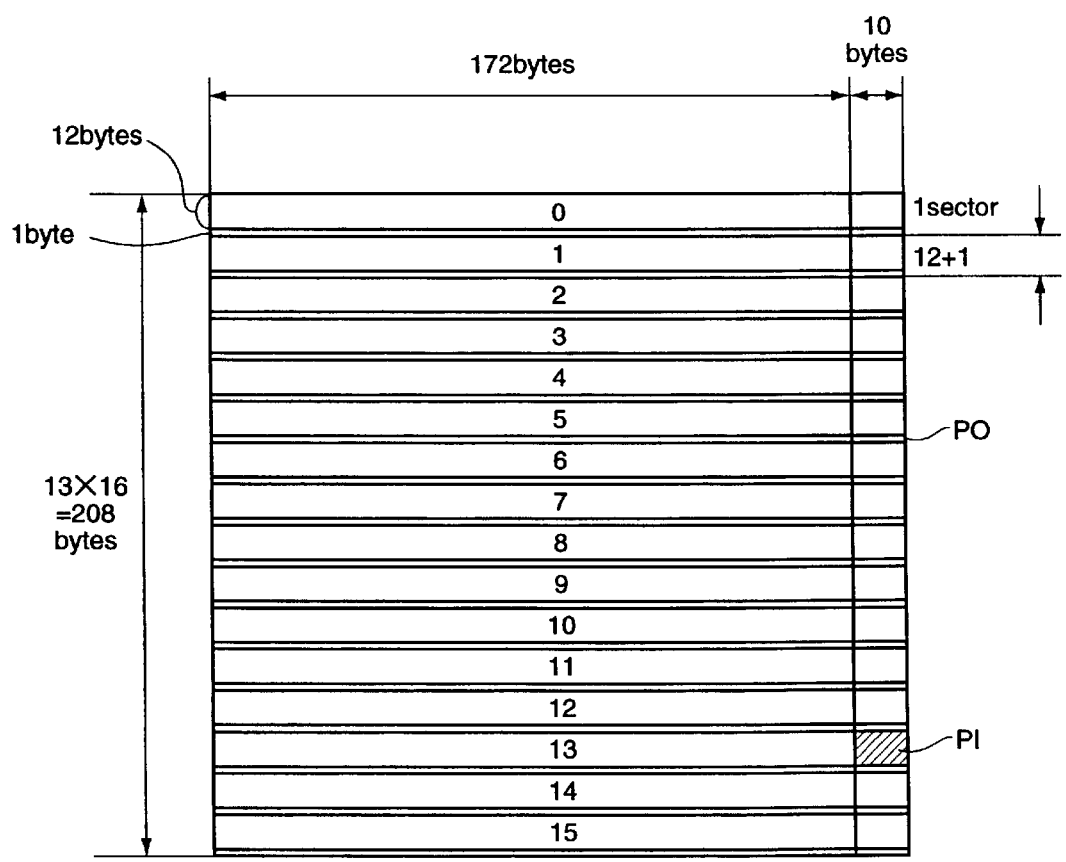
FIG. 26 is a view illustrating the interleaved state of external code of FIG. 25.
Figure 27:
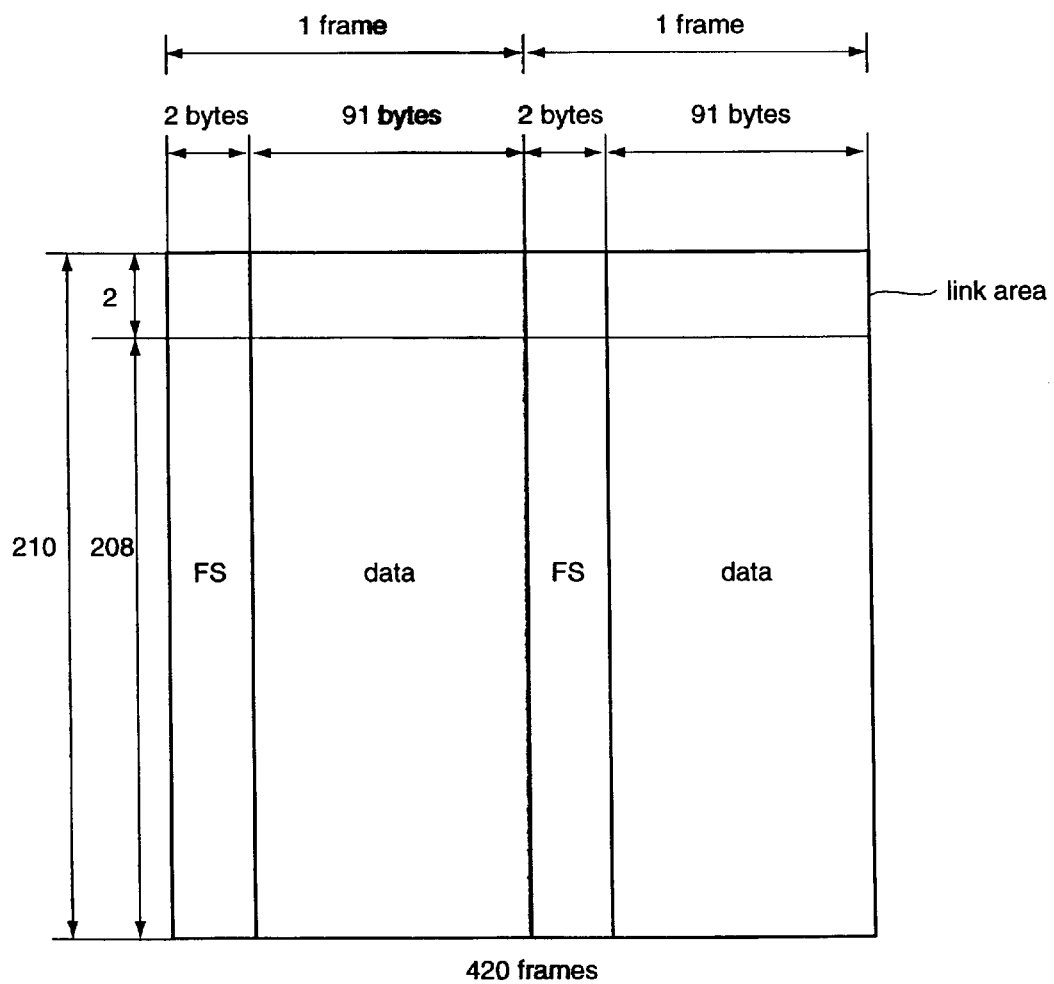
FIG. 27 is a view illustrating the configuration of 32 kbytes of data.

Moreover, the 208×182 bytes of data shown in FIG. 26 are divided by two in the vertical direction as shown in FIG. 27, one frame is taken to be 91 bytes of data and 208×2 frames of data. Then, 2×2 frames of link data (link area data) is added (to be more specific, one part of the four frame portion of data is recorded at the head of the cluster, with the remainder being recorded at the end of the cluster) to the head of the 208×2 frames of data. Two bytes of frame synchronization signal (FS) are then added to the head of the 91 bytes of frame data. As a result, as shown in FIG. 27, one frame of data is 93 bytes of data giving a 210 (=208+2)×(93×2) byte (420 frame) total block of data. This is one cluster (blocks taken as recording units) portion of data. The size of the real data part is then 32 kbytes (=2048×16/1024 kbytes) excluding this overhead portion.

Namely, in the case of this embodiment, one cluster comprises 16 sectors, with one sector comprising 26 frames.

Figure 28:
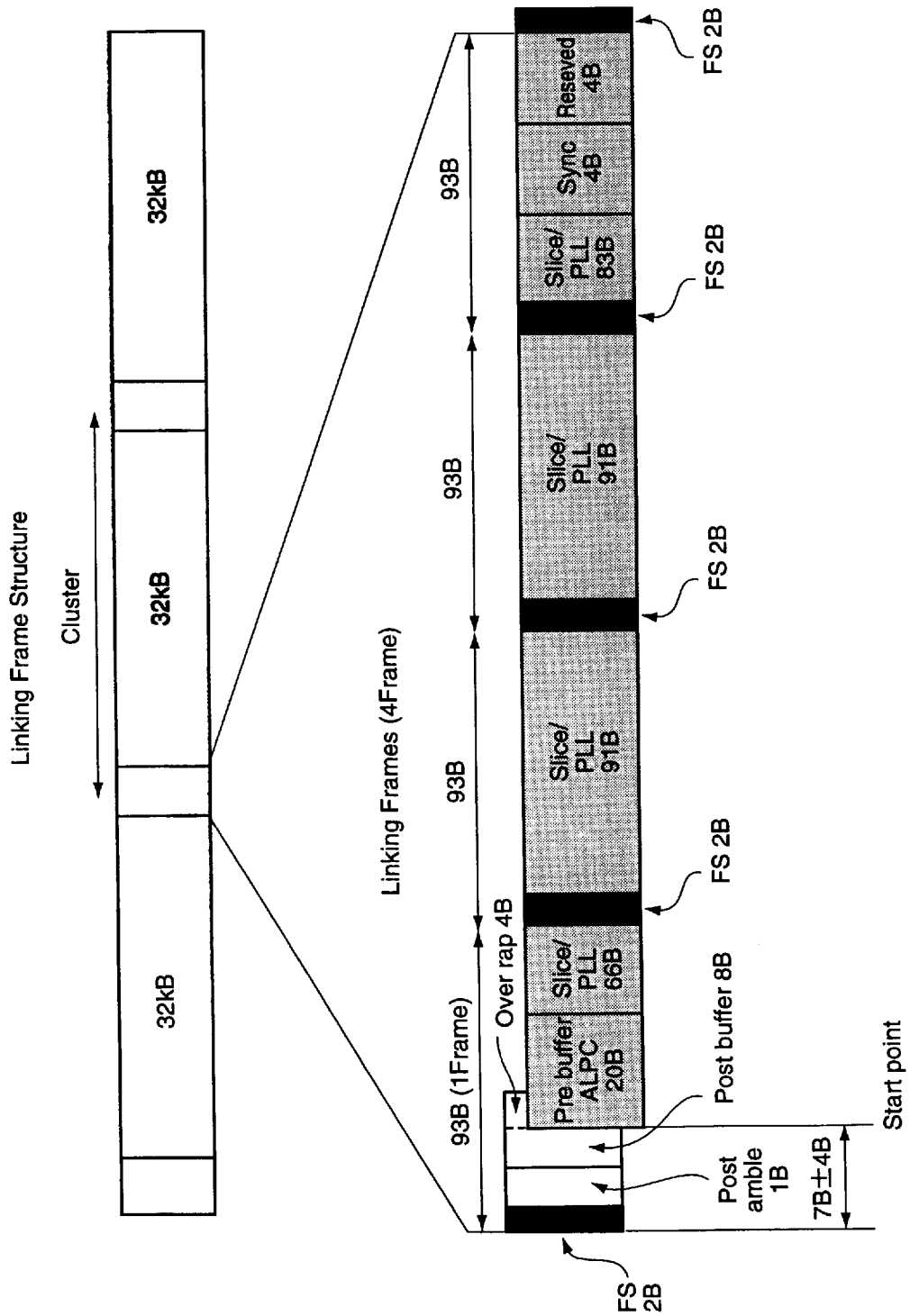
FIG. 28 is a view showing an example configuration of a link area.

A link area is then arranged between clusters as shown in FIG. 28 because this data is recorded on the disc 1 in cluster units.

The linking area comprises four frames (data frames) as shown in FIG. 28, with one frame of data being 93 bytes as in the case for data areas (within clusters). Two bytes of frame synchronization signal (FS) (Frame Sync) are provided at the head of each frame.

The link area is 86 bytes and three frames of data added and recorded before the 32 kbyte data blocks (clusters). Of this 86 bytes of data, the leading 20 bytes are for a prebuffer (Prebuffer) and ALPC (Automatic Laser Power Control). The prebuffer is a buffer for absorbing shifts in the start position of the clusters due to jitter. The ALPC is an area for recording power setting use recorded with data for setting the laser light output during recording and playback to prescribed values.

Slice/PLL is then arranged at the next 66 bytes. Slice is data for setting a time constant for binarizing the playback data and the PLL is data for playing back the clock.

Slice/PLL are then arranged at the following two frames respectively. Slice/PLL is then arranged at the leading 83 bytes of the final frame, with a synchronization signal (Sync) then being provided at the subsequent four bytes. The final four bytes are then reserved (Reserve) for future use.

Two bytes of frame synchronization signal, one byte of postamble (Postamble) and 8 bytes of postbuffer (Postbuffer) are then formed after the 32 kbyte (cluster) data block. The postamble is for regulating the length of the mark for the final data and is recorded with data for returning signal polarity. The postbuffer is a buffer for absorbing jitter due to eccentricity. In the ideal case where there is no jitter whatsoever, four bytes of the eight byte post buffer overlap and the following cluster prebuffer and ALPC are recorded.

This link area can also be applied to ROM discs and a format where ROM discs and RAM discs are used in common is also possible. In this case, with a ROM disc it is possible to record information at the link area postbuffer, prebuffer and ALPC. For example, the address can be inputted and it is then possible to increase probability of address information.

Figure 29:
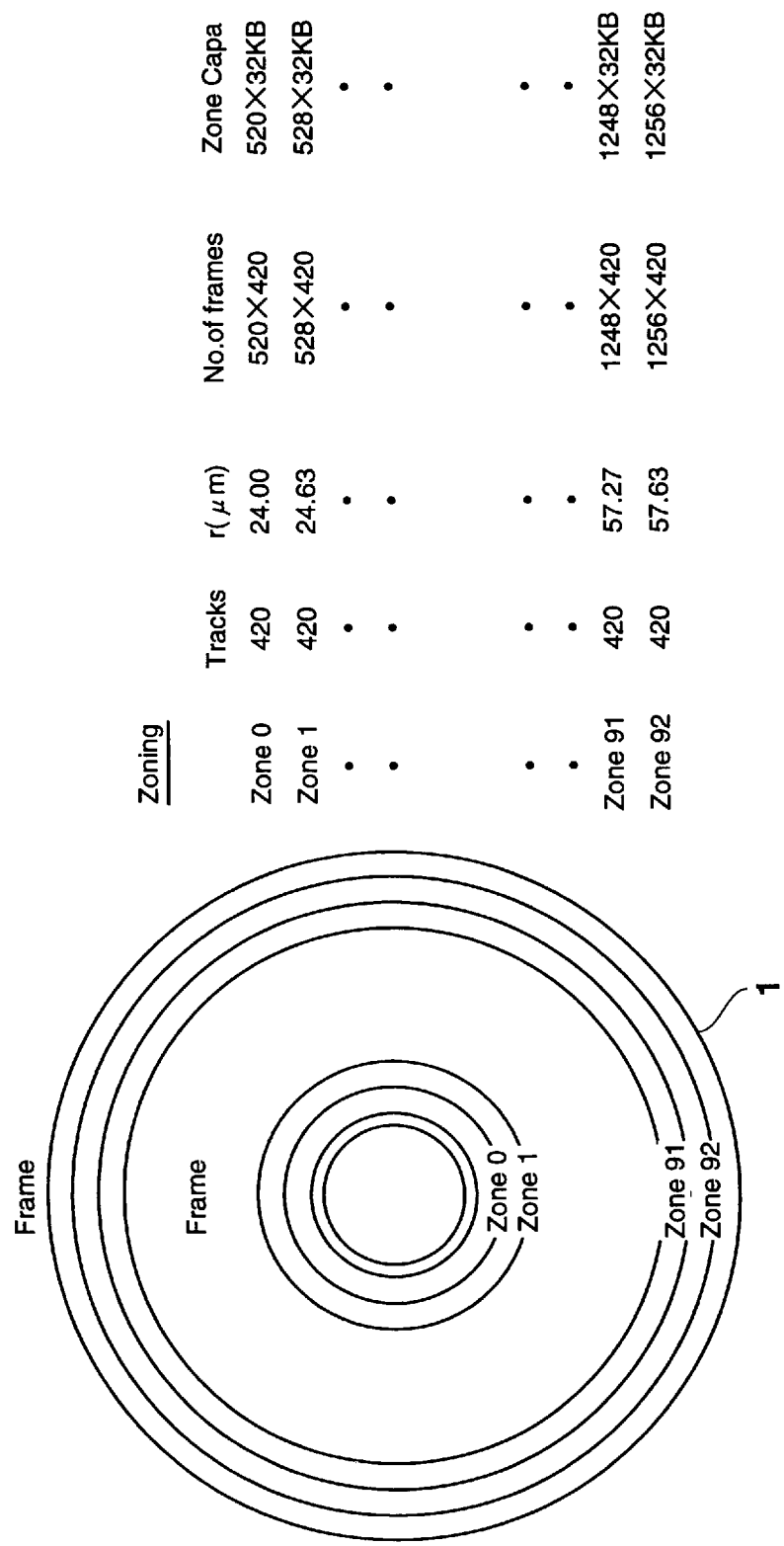
FIG. 29 is a view showing a disc divided into 93 zones.

In the above manner, as shown in FIG. 19 to FIG. 22, when the disc 1 divided into 93 zones is expressed schematically, it appears as shown in FIG. 29. In the above embodiment, any one of the 93 zones is rotatably driven at a constant velocity. However, it is also possible for bands to comprise a plurality of zones with there being constant velocities within each band or with the disc being rotatably driven at a different angular velocity for every band.

Figure 30:
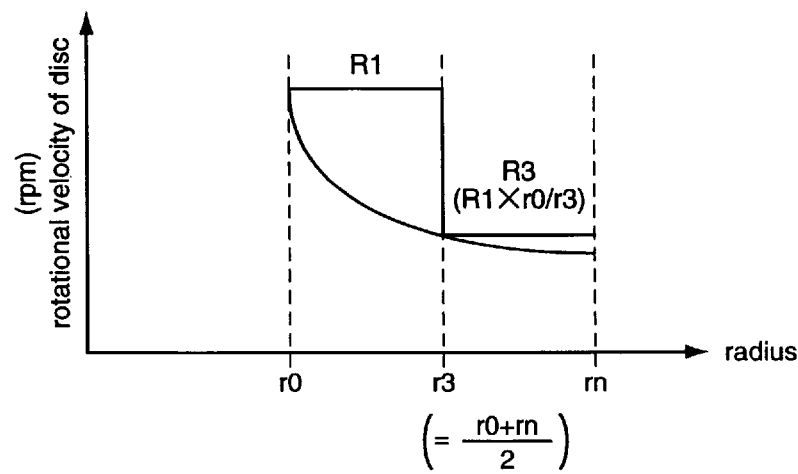
FIG. 30 is a view illustrating the rotational velocity of the disc in the case of dividing into two bands.

For example, as shown in FIG. 30, when the range from the radius r0 of the inner periphery to the radius rn of the outer periphery is taken as the region for recording and playing back data, the region is divided at the position of an intermediate radius r3 (=(r0+rn)/2), i.e., divided into a band from the radius r0 to the radius r3 and a band from the radius r3 to the radius rn. When the disc 1 is then rotatably driven at a constant angular velocity within each of the bands and the angular velocity (rotational velocity) occurring at the radius r0 is taken to be R1, the angular velocity R3 occurring at the radius r3 is inversely proportional to the radius and can therefore be given by the following equation.

$$R3 = R1 \times (r0/r3)$$

Figure 31:
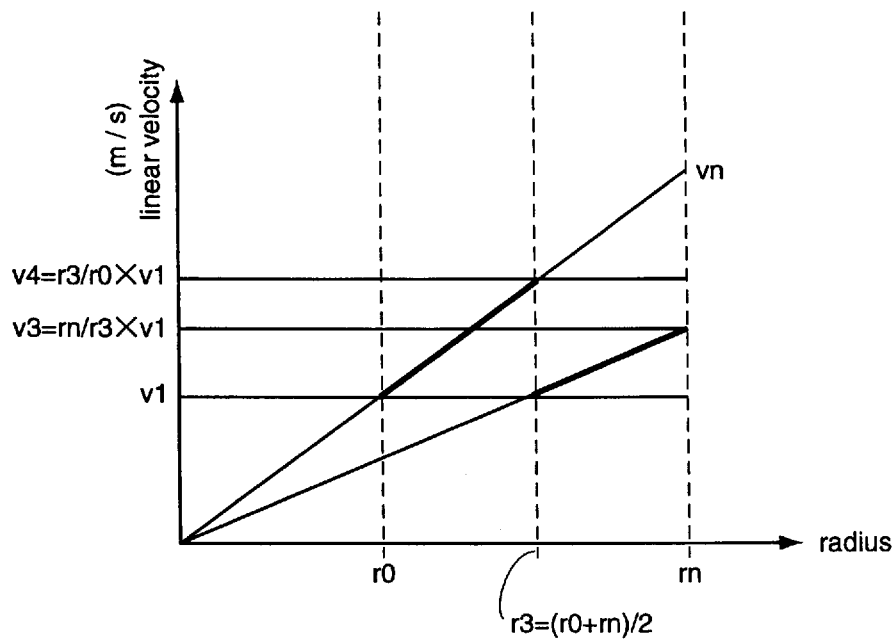
FIG. 31 is a view illustrating the linear velocity in the case of dividing into two bands.

When the linear velocity v1 occurring at the radius r0 is taken to be v1 as shown in FIG. 31, a linear velocity v4 occurring at the radius r3 within the initial band is proportional to the radius and can therefore be obtained from the following equation.

$$v4 = (r3/r0) \times v1$$

Moreover, the linear velocity v3 occurring at the radius rn can be obtained from the following equation because the linear velocity occurring at the radius r3 at the next band is v1.

$$v3 = (rn/r3) \times v1$$

The rotational velocity can therefore be made slower for the band from the radius r3 to the radius rn than for the band from the radius r0 to the radius r3 by dividing the region into bands in this manner. The recording capacity can therefore be increased by this amount from that for the usual CAV method mentioned above.

In the embodiment in FIG. 30 and FIG. 31, the band was divided by a radius r3 in the middle of the radius r0 at the innermost periphery and the radius rn at the outermost periphery. The width of the change in the linear velocity occurring at the two bands is therefore different.

Figure 32:
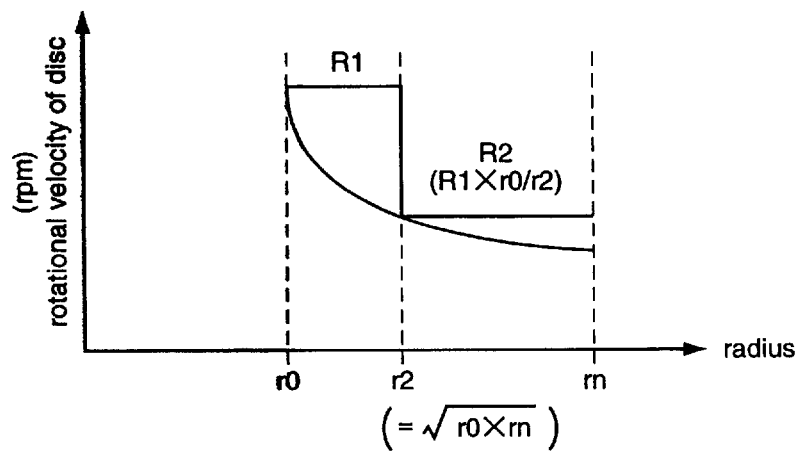
FIG. 32 is a view illustrating the rotational velocity of the disc in the case of dividing into two bands.
Figure 33:
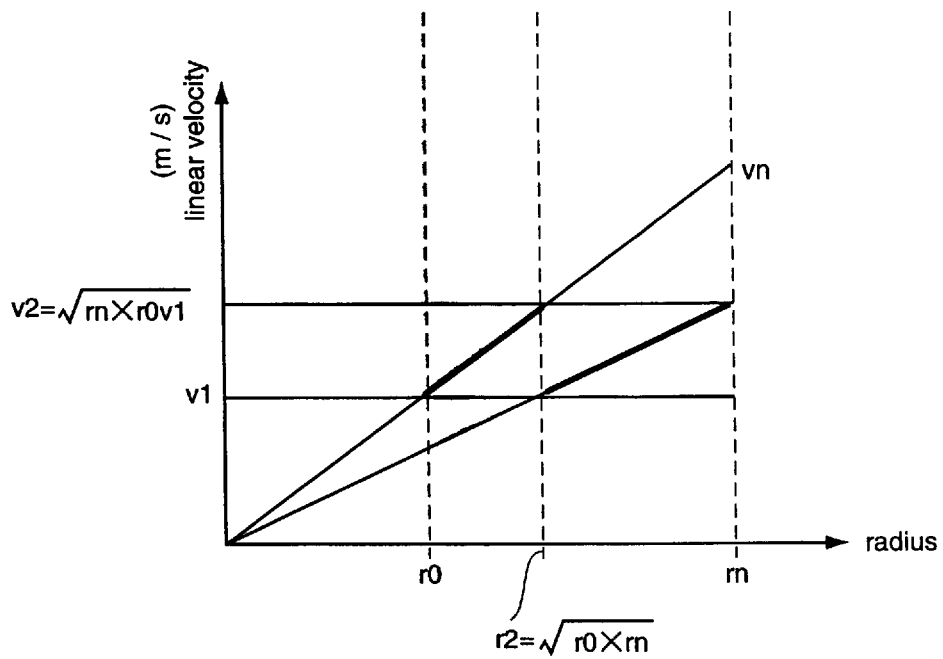
FIG. 33 is a view illustrating the linear velocity in the case of dividing into two bands.

As shown, for example, in FIG. 32 and FIG. 33, the width of the change in linear velocity occurring at the two bands can be made to be the same.

In this case, when the radius dividing the bands is taken to be r2 and the linear velocities occurring at the end points of each of the bands is taken to be v2, then the following equation can be obtained from the relationship of the linear velocities.

$$v1/r0 = v2/r2$$

$$v1/r2 = v2/rn$$

The following equation can therefore be obtained from the above equation.

$$r2 = (r0 \times rn)^{1/2}$$

$$v2 = (rn \times r0)^{1/2} \times v1$$

Moreover, when the rotational velocity occurring at the band from the radius r0 to the radius r2 occurring in this case is taken to be R1, and the rotational velocity from the radius r2 to the radius rn is taken to be R2, R2 is obtained the following equation.

$$R2 = R1(r0/r2) = (r0/rn)^{1/2} \times R1$$

In this manner, if dividing into two bands is carried out at the radius r2, the width of the change in the linear velocity occurring at each band can be made to be the same.

Figure 34:
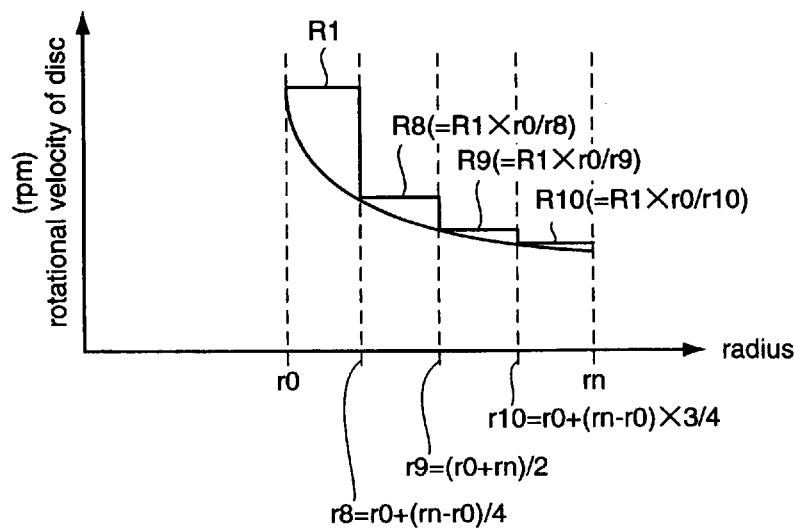
FIG. 34 is a view illustrating the rotational velocity of the disc in the case of dividing into four bands.
Figure 35:
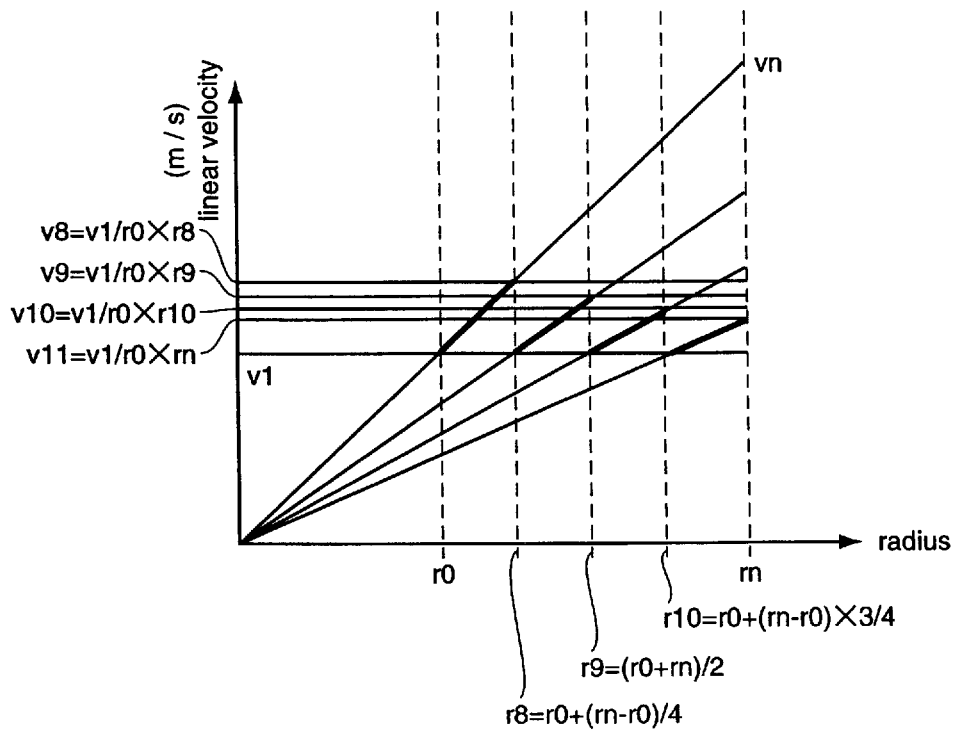
FIG. 35 is a view illustrating the linear velocity in the case of dividing into four bands.
Figure 36:
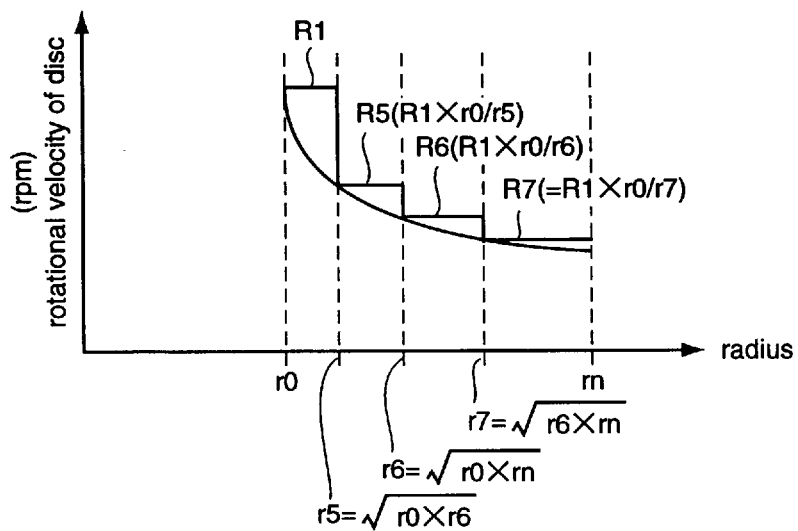
FIG. 36 is a view illustrating the rotational velocity of the disc in the case of dividing into four bands.
Figure 37:
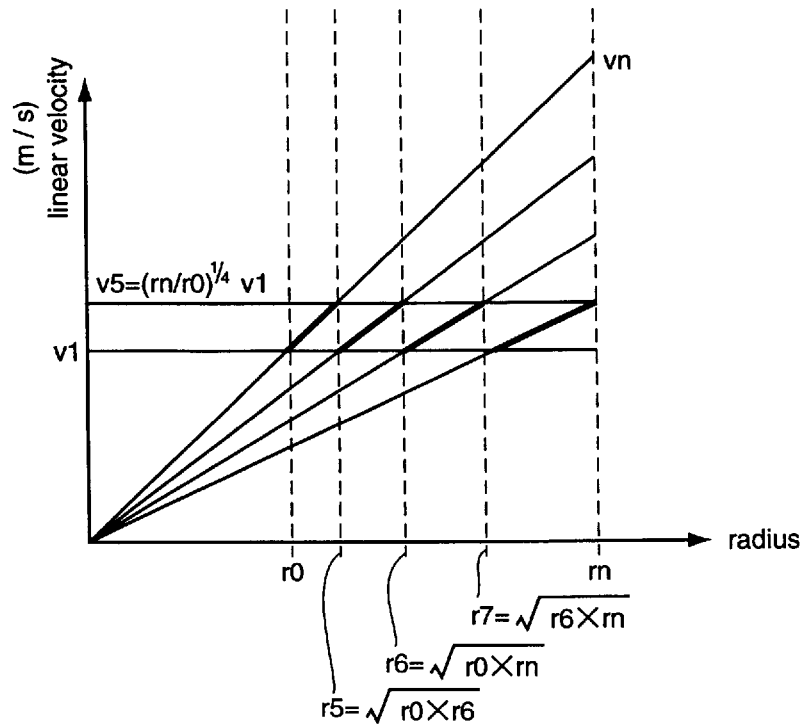
FIG. 37 is a view illustrating the linear velocity in the case of dividing into four bands.

The number of bands was taken to be two in the above embodiment, but this can also be taken to be four. FIG. 34 and FIG. 35 correspond to FIG. 30 and FIG. 31 and show the case of generating four equally divided bands at radii r8, r9 and r10 within the range from r0 to rn. FIG. 36 and FIG. 37 correspond to FIG. 32 and FIG. 33 and show the case where the band is divided using the radii r5, r6 and r7 in such a manner that the width of the change in linear velocity occurring at each of the bands becomes the same.

Namely, in the embodiment shown in FIG. 34 and FIG. 35, the range from the radius r0 to the radius rn is divided equally into four by the radii r8, r9 and r10, with each of the radii being expressed by the following equations.

$$r8 = r0 + (rn - r0)/4$$

$$r9 = (r0 + rn)/2$$

$$r10 = r0 + (3/4)(rn - r0)$$

Further, the rotational velocities R8, R9 and R10 of each of the bands can be expressed by the following equations.

$$R8 = R1 \times (r0/r8)$$

$$R9 = R1 \times (r0/r9)$$

$$R10 = R1 \times (r0/r10)$$

Moreover, the linear velocities v8, v9, v10 and v11 occurring at the end points of each of the bands for the radii r8, r9, r10 and rn can be obtained from the following equations.

$$v8 = (v1/r0) \times r8$$

$$v9 = (v1/r0) \times r9$$

$$v10 = (v1/r0) \times r10$$

$$v11 = (v1/r0) \times rn$$

On the other hand, in the embodiment of FIG. 36 and FIG. 37, the rotational velocities R5, R6 and R7 from radius r5 to r6, radius r6 to r7 and radius r7 to rn can be obtained from the following equations.

$$R5 = R1 \times (r0/r5)$$

$$R6 = R1 \times (r0/r6)$$

$$R7 = R1 \times (r0/r7)$$

The following equation can then be arrived at when the linear velocity occurring at the radii r5, r6, r7 and rn of the end points of each of the bands is taken to be v5, as shown in FIG. 37.

$$v1/v5 = r0/r5 = r5/r6 = r6/r7 = r7/rn$$

The following equations can then be obtained.

$$r5 = (r0 \times r6)^{1/2}$$

$$r6 = (r0 \times rn)^{1/2}$$

$$r7 = (r6 \times rn)^{1/2}$$

The linear velocity v5 occurring at each of the radii r5, r6, r7 and rn can then be obtained from the following equations.

$$\begin{aligned} v5 &= (r5/r0)v1 = (r0 \times r6)^{1/2}(v1/r0) \\ &= (r6/r0)^{1/2}v1 = ((r0 \times rn)^{1/2}/r0)^{1/2}v1 \\ &= (rn/r0)^{1/4}v1 \end{aligned}$$

In the case of usual CAV discs, the relative change is vn–v1 because the linear velocity occurring at the position of the radius rn is vn. However, in the embodiment shown in FIG. 36 and FIG. 37, this can be suppressed to be a change of width of v5–v1 (a width of change of a quarter or less than ((vn–v1).

Figure 38:
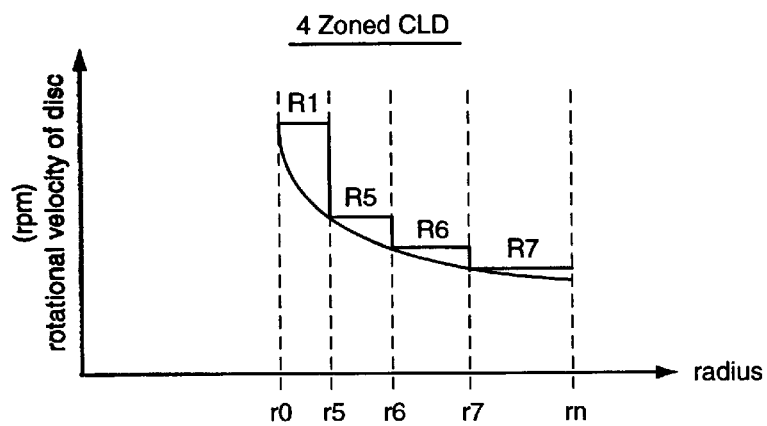
FIG. 38 is a view illustrating the rotational velocity of the disc in the case of dividing into four bands.
Figure 39:
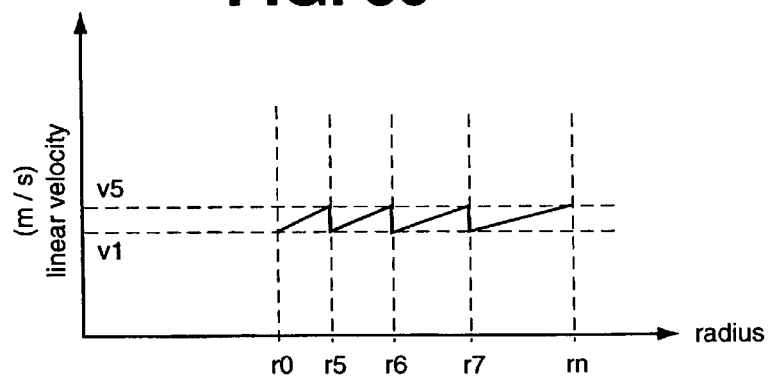
FIG. 39 is a view illustrating the linear velocity in the case of dividing into four bands.
Figure 40:
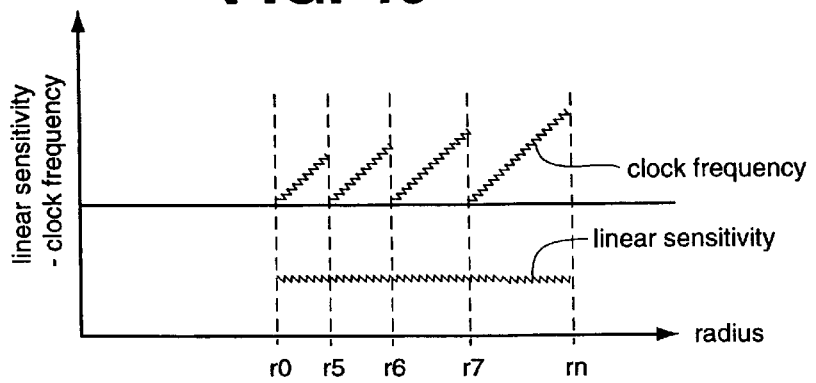
FIG. 40 is a view illustrating the linear velocity and clock frequency in the case of dividing into four bands.

When the range from the radius r0 to the radius rn is divided into four bands by the radii r5, r6 and r7 so as to give a constant width of change of linear velocity, the rotational velocity of the disc, linear velocity, and the linear density and clock frequency change in the manner shown in FIG. 38 to FIG. 40.

Namely, the rotational velocity is R1 at the band from the radius r5, R5 at the band from the radius r5 to the radius r6, R6 at the band from the radius r6 to the radius r7, and R7 at the band from the radius r7 to the radius rn. Further, as shown in FIG. 39, the linear velocity at each of the bands increases from v1 to v5 in the direction from the innermost periphery to the outermost periphery and the width of change at each of the bands is constant.

Further, as shown in FIG. 40, the clock frequency is constant within each zone but is changed among each zone. The sequential clock frequency is therefore larger for zones on the side of the outer periphery than for zones on the side of the inner periphery. Moreover, the clock frequencies at the start points of each of the bands for the radii r0, r5, r6 and r7 are the same but the values of the clock frequencies occurring at the end points of each of the bands is higher for bands towards the outer periphery because the width (number of tracks) of each of the bands differs.

The linear density at each zone is smaller for zones on the side of the outer periphery when compared to zones on the side of the inner periphery but the width of change is constant for whichever band of whichever zone.

Figure 41:
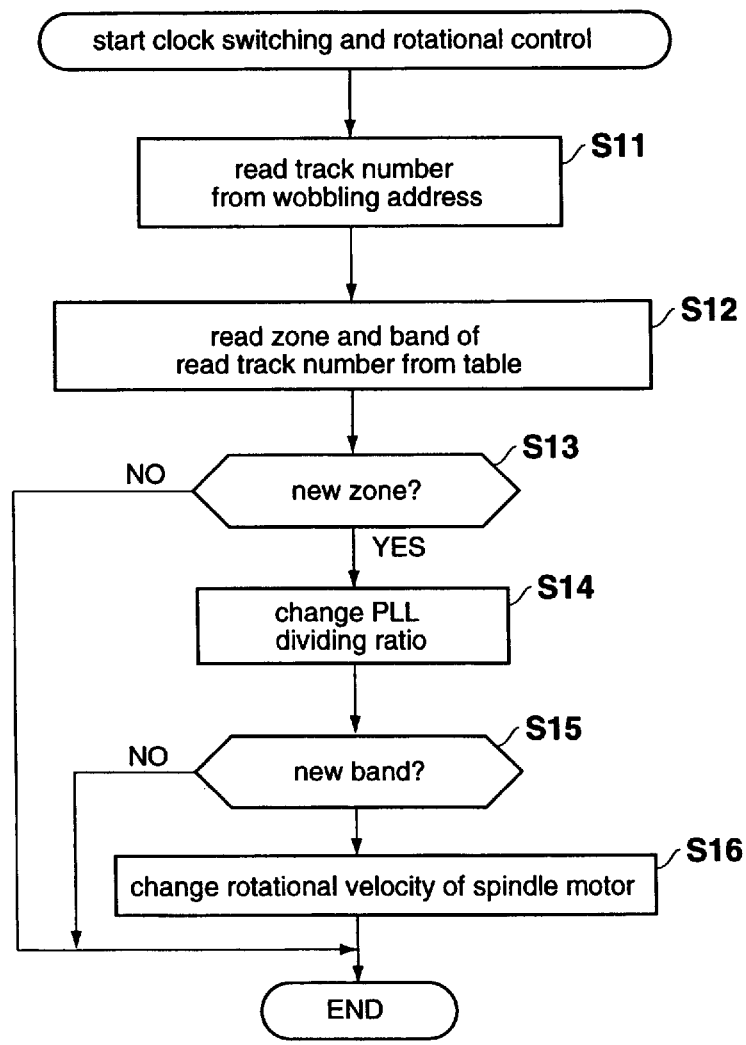
FIG. 41 is a flowchart illustrating the clock changeover and rotational control processes in the case of dividing a band.

In this manner, when a plurality of zones are gathered together and divided into a plurality of bands, the controller 38 executes the clock changeover and rotational control processes shown in FIG. 41. Step S11 to step S14 of this process are basically the same as the process in step S1 to S4 of FIG. 23. Namely, in step S11, the track number is read from the wobble address, with the zone and track number of the read-out track number being read out in step S12. Then, in step S13, a determination is made as to whether or not the zone for the read-out track number is a new zone. If this is determined to be a new zone, step S14 is proceeded to. A dividing ratio modification process for the PLL circuit 41 is then carried out and, in step S15, a determination is made as to whether or not the band of the track number read out in step S12 is a new band. If this is determined to be a new band, step S16 is proceeded to and the controller 38 changes the angular velocity of the spindle motor 31 so as to correspond to the new band.

When it is determined in step S13 that this is not a new zone, the process from step S14 to S16 is skipped. Further, the process in step S16 is also skipped when it is determined in step SIS that the band of the read-out track number is not the new band number.

When each of the zones of the 93 zones from zone 0 to zone 92 shown in FIG. 29 are gathered together into bands with the width of the change in the linear velocity occurring at each of the bands being constant as shown in FIG. 36 and FIG. 37, each of the parameters are as shown in FIG. 42 to FIG. 45. In these drawings, the seven strings of data on the left side are the same as for the case in FIG. 19 to FIG. 22 and the three strings of data on the right side show the rotational velocity at each zone, the lowest linear velocity at each zone and the highest linear velocity at each zone, respectively. As shown in these drawings, in this embodiment, zones 0 to 15 are taken as the first band, zones 16 to 35 are taken as the second band, zones 36 to 60 are taken as the third band and zones 61 to 92 are taken as the fourth band.

The length (byte number) of each of the regions occurring in the aforementioned embodiment is one example and can be set to an appropriate prescribed value.

Further, the present invention can also be applied to the recording and playing back of data on discs other than optical discs.

What is claimed is:

1. A recording/playback device for recording data to and playing back data from a disc where regions for recording data are divided into a plurality of zones and a number of data units per one revolution of an outer periphery side zone of a neighboring two of said zones is set to be a larger value than a number of said data units per one revolution of the inner periphery side zone of said pair of zones, said recording/playback device comprising:

reading means for reading track numbers of access points of said disc;

storage means for storing said track numbers and said zones in such a manner that the track numbers of each of said zones correspond to an integer multiple of a number of a plurality of said data units comprising recording or playback units;

determining means for determining said zone for which said track number read by said reading means belongs to by referring to a table for said storage means; and control means for controlling recording and playing back of said data in accordance with determination results of said determining means.

2. A recording/playback device according to claim 1, wherein said data units are data frames;

said sectors comprise a plurality F of said data frames where F is an integer;

said clusters comprise a plurality S of said sectors, where S is an integer;

data is recorded to and played back from said sectors and clusters in recording and playback units; and of two neighboring said zones, the data frame number per one revolution of said zone of the outer periphery side is set to be just an integer value K larger than the data frame number per one revolution of said zone of the side of the inner periphery, where K is smaller than said integer F.

3. A recording/playback method for recording data to and playing back data from a disc where regions for recording data are divided into a plurality of zones and a number of data units per one revolution of an outer periphery side zone of a neighboring two of said zones is set to be a larger value than a number of said data units per one revolution of the inner periphery side zone of said pair of zones, comprising the steps of:

reading track numbers of access points of said disc;

determining a zone corresponding to a track number read from a table of said track numbers and zones provided in such a manner that said track numbers of each of said zones correspond to an integer multiple of a number of a plurality of said data units comprising recording or playback units; and controlling recording and playing back said data in such a manner as to correspond to results of said determination.

4. A disc where regions for recording data are divided into a plurality of zones and a number of data units per one revolution of an outer periphery side zone of a neighboring two of said zones is set to be a larger value than a number of said data units per one revolution of the inner periphery side zone of said pair of zones, wherein the number of tracks for each of said zones is set to be an integer number of times of the number of a plurality of said data units comprising recording or playback units.

5. A recording/playback device for recording data to and playing back data from a disc where regions for recording data are divided into a plurality of zones and a number of data units per one revolution of an outer periphery side zone of a neighboring two of said zones is set to be a larger value than a number of said data units per one revolution of the inner periphery side zone of said pair of zones, said recording/playback device comprising:

reading means for reading track numbers of access points of said disc;

storage means for storing a table of said track numbers and bands in such a manner as to correspond to the plurality of said zones comprising said bands;

determining means for determining said zone for which said track number read by said reading means belongs to by referring to said storage means table; and control means for controlling the rotation of said disc in such a manner as to be of a fixed angular velocity within said bands and so that different said bands have different angular velocities, in accordance with determination results of said determination.

6. A recording/playback device according to claim 5, wherein said table is made to correspond in such a manner that the width of changes in the linear velocity occurring with said bands is the same for each band.

7. A recording/playback method for recording data to and playing back data from a disc where regions for recording data are divided into a plurality of zones and a number of data units per one revolution of an outer periphery side zone of a neighboring two of said zones is set to be a larger value than a number of said data units per one revolution of the inner periphery side zone of said pair of zones, comprising the steps of:

reading track numbers of access points of said disc;

determining which band a track number read from a table of said track numbers and bands made to correspond with a plurality of said zones comprising said bands belongs to; and controlling the rotation of said disc in such a manner as to be of a fixed angular velocity within said bands and so that different said bands have different angular velocities, in accordance with determination results of said determination.

8. A disc where regions for recording data are divided into a plurality of zones and a number of data units per one revolution of an outer periphery side zone of a neighboring two of said zones is set to be a larger value than a number of said data units per one revolution of the inner periphery side zone of said pair of zones, wherein bands comprise pluralities of said zones, with angular velocity being fixed within said bands and rotation being carried out at different angular velocities for different said bands.

* * * * *